US010699167B1

(12) United States Patent
Dowdall et al.

(10) Patent No.: US 10,699,167 B1
(45) Date of Patent: Jun. 30, 2020

(54) PERCEPTION VISUALIZATION TOOL

(71) Applicant: Waymo LLC, Mountain View, CA (US)

(72) Inventors: Jonathan Baldwin Dowdall, Mountain View, CA (US); Nafees Ahmed, Mountain View, CA (US); Lo Po Tsui, Mountain View, CA (US); Peter Morton, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 104 days.

(21) Appl. No.: 16/165,468

(22) Filed: Oct. 19, 2018

(51) Int. Cl.
*G06K 9/62* (2006.01)
*G06K 9/00* (2006.01)
*G06F 3/0484* (2013.01)
*G06F 3/0481* (2013.01)

(52) U.S. Cl.
CPC ....... *G06K 9/6263* (2013.01); *G06K 9/00791* (2013.01); *G06K 9/6259* (2013.01); *G06F 3/0481* (2013.01); *G06F 3/0484* (2013.01); *G06K 9/6289* (2013.01); *G06K 2209/27* (2013.01)

(58) Field of Classification Search
CPC .. G06K 9/6221; G06K 9/6242; G06K 9/6267; G06K 9/627; G06K 9/6282; G06K 9/0063; G06K 9/00637; G06K 9/6215; G06K 9/6219; G06K 9/00228; G06K 9/6263; G06K 9/00791; G06K 9/6259; G06T 7/0002; G06T 7/0004; G06T 7/12; G06T 7/11; G06T 7/90; G06T 7/55; G06T 3/0068; G06T 15/04; G06F 16/5854; A63F 13/655; A63F 13/00; A63F 13/327; A63F 13/213; A63F 13/25; A63F 13/32; A63F 13/332; A63F 13/335
See application file for complete search history.

(56) References Cited

U.S. PATENT DOCUMENTS

| 8,605,998 B2* | 12/2013 | Samples | G06K 9/00201 382/104 |
| 9,679,191 B1* | 6/2017 | Zhu | G06T 7/521 382/104 |
| 9,916,703 B2* | 3/2018 | Levinson | G06Q 10/06 |

OTHER PUBLICATIONS

Zhu et al., "3D LIDAR Point Cloud based Intersection Recognition for Autonomous Driving", IEEE, Intelligent Vehicles Symposium, Alcalá de Henares, Spain, Jun. 3-7, 2012, pp. 456-461. (Year: 2012).*

(Continued)

*Primary Examiner* — Duy M Dang
(74) *Attorney, Agent, or Firm* — Botos Churchill IP Law

(57) ABSTRACT

Aspects of the disclosure relate to generating a grid or a visual list to facilitate operator review of labels. The system receives a first set of labels generated by a first labeling source and a second set of labels generated by a second labeling source. The first set of labels and the second set of labels each classify one or more objects perceived in one or more scenes captured by a sensor of a vehicle, such that each of the one or more objects has a corresponding first label and a corresponding second label. The system determines discrepancies between the corresponding first label and the corresponding second label for each of the one or more objects, and generates a grid or a visual list using the determined discrepancies. The system provides the grid or the visual list for display to a human operator.

20 Claims, 19 Drawing Sheets

(56) References Cited

OTHER PUBLICATIONS

He et al., "Automatic Vector-based Road Structure Mapping Using Multi-beam LiDAR", IEEE, 21st International Conference on Intelligent Transportation Systems (ITSC), Maui, Hawaii, USA, Nov. 4-7, 2018, pp. 417-422. (Year: 2018).*
Wang et al., "Rapid Tracking for Autonomous Driving with Monocular Video", IEEE, 2013 International Conference on Connected Vehicles and Expo (ICCVE), pp. 133-138. (Year: 2013).*
Shaoshan Liu et al. Implementing a Cloud Platform for Autonomous Driving. Apr. 10, 2017. 8 pages. Retrieved from the Internet: <https://arxiv.org/ftp/arxiv/papers/1704/1704.02696.pdf>.

\* cited by examiner

| Object | Bounding Box | First Labeling Source | First Set of Labels | Second Labeling Source | Second Set of Labels |
|---|---|---|---|---|---|
| 401 | (x1, y1, z1)... | Object Detection Model 147 | CAR | Object Detection Model 148 | LAWN MOWER |
| 402 | (x2, y2, z2)... | Object Detection Model 147 | CAR | Object Detection Model 148 | CAR |
| 403 | (x3, y3, z3)... | Object Detection Model 147 | CAR | Object Detection Model 148 | CAR |
| 404 | (x4, y4, z4)... | Object Detection Model 147 | TRUCK | Object Detection Model 148 | CAR |
| 405 | (x5, y5, z5)... | Object Detection Model 147 | CAR | Object Detection Model 148 | CAR |
| 406 | (x6, y6, z6)... | Object Detection Model 147 | CAR | Object Detection Model 148 | CAR |

| Label | Probability |
|---|---|
| CAR | 0.7 |
| SHOPPING CART | 0.2 |
| PEDESTRIAN | 0.1 |
| ANIMAL | 0 |

| Label | Probability |
|---|---|
| LAWN MOWER | 0.4 |
| CAR | 0.3 |
| PEDESTRIAN | 0.2 |
| ANIMAL | 0.1 |

FIGURE 4C

| Object | Bounding Box | First Labeling Source | First Set of Labels | Second Labeling Source | Second Set of Labels |
|---|---|---|---|---|---|
| 401 | (x1, y1, z1)... | Object Detection Model 147 | CAR | Human operator | CAR |
| 402 | (x2, y2, z2)... | Object Detection Model 147 | CAR | Human operator | CAR |
| 403 | (x3, y3, z3)... | Object Detection Model 147 | CAR | Human operator | CAR |
| 404 | (x4, y4, z4)... | Object Detection Model 147 | TRUCK | Human operator | TRUCK |
| 405 | (x5, y5, z5)... | Object Detection Model 147 | CAR | Human operator | CAR |
| 406 | (x6, y6, z6)... | Object Detection Model 147 | CAR | Human operator | EMERGENCY VEHICLE |

| Label | Probability |
|---|---|
| CAR | 0.7 |
| SHOPPING CART | 0.2 |
| PEDESTRIAN | 0.1 |
| ANIMAL | 0 |

FIGURE 4D

PERCEPTION VISUALIZATION TOOL

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

BRIEF SUMMARY

Aspects of the disclosure provides for receiving, by one or more processors, a first set of labels generated by a first labeling source, the first set of labels classifying one or more objects perceived in one or more scenes captured by a sensor of a vehicle, such that each of the one or more objects has a corresponding first label of the first set of labels; receiving, by the one or more processors, a second set of labels generated by a second labeling source different from the first labeling source, the second set of labels classifying the one or more objects perceived in the scenes, such that each of the one or more objects has a corresponding second label of the second set of labels; determining, by the one or more processors, discrepancies between the corresponding first label and the corresponding second label for each of the one or more objects; generating, by the one or more processors using the determined discrepancies, a grid of cells, where each of the cells is associated with an object having a discrepancy between its corresponding first label and its corresponding second label; and providing, by the one or more processors, the grid of cells for display to a human operator.

The method may further comprise receiving, by the one or more processors, a request to search for cells by a specified value for the first corresponding label; regenerating, by the one or more processors, a grid of cells, where each of the cells is associated with an object whose corresponding first label is equal to the specified value; and providing, by the one or more processors, the regenerated grid for display to the human operator.

The method may further comprise receiving, by the one or more processors, a request to search for cells by a specified type of discrepancy between the corresponding first label and the corresponding second label; regenerating, by the one or more processors, a grid of cells, where each of the cells is associated with an object whose corresponding first label and corresponding second label has the specified type of discrepancy; and providing, by the one or more processors, the regenerated grid for display to the human operator.

The first set of labels may be generated using an object detection model, and the second set of labels may be created manually by human operators.

The method may further comprise, in response to the providing the grid of cells for display, receiving, by the one or more processors, an user input selecting a cell of the grid of cells; and in response to receiving the user input, providing, by the one or more processors, metadata for the object associated with the selected cell for display to the human operator. The method may further comprise receiving, by the one or more processors, an indication that the human operator had reviewed the metadata; and in response to receiving the indication, changing an appearance of the selected cell, by the one or more processors, in order to mark the selected cell as being reviewed. The method may further comprise receiving, by the one or more processors, an user input flagging the object for further training the object detection model; and in response to receiving the user input, sending, by the one or more processors, the metadata to a remote server for further training the object detection model.

The method may further comprise in response to the providing, by the one or more processors, the grid of cells for display, receiving an user input selecting a cell; in response to receiving the user input, providing, by the one or more processors, an interactive visual representation of the object associated with the selected cell for display to the human operator, wherein the interactive visual representation includes a plurality of images taken from different sensor angles corresponding to a plurality of views of the object; receiving, by the one or more processors, a user selection of one of the plurality of views of the object; and providing, by the one or more processors, the selected view of the object for display to the human operator. The method may further comprise providing, by the one or more processors, metadata associated with the selected view of the object for display to the human operator.

The method may further comprise, in response to the providing, by the one or more processors, the grid of cells for display, receiving a first user input selecting a cell; receiving, by the one or more processors, a second user input including a corrected second label; and in response to receiving the second user input, updating, by the one or more processors, the corresponding second label with the corrected second label.

The first set of labels may be generated using a first object detection model, and the second set of labels may be generated using a second object detection model, the first object detection model being different from the second object detection model. The method may further comprise, in response to the providing the grid of cells for display, receiving, by the one or more processors, a first user input selecting a cell of the grid of cells; in response to receiving the first user input, providing, by the one or more processors, metadata of the object associated with the selected cell for display to the human operator; receiving, by the one or more processors, a second user input flagging the object for further training the first object detection model; and sending, by the one or more processors, the metadata to a remote server for further training the first object detection model.

Aspects of the disclosure further provides for receiving, by one or more processors, a first set of labels generated by a first labeling source, the first set of labels classifying one or more objects perceived in one or more scenes captured by a sensor of a vehicle, such that each of the one or more objects has a corresponding first label of the first set of labels; receiving, by the one or more processors, a second set of labels generated by a second labeling source different from the first labeling source, the second set of labels classifying the one or more objects perceived in the scenes, such that each of the one or more object has a corresponding second label of the second set of labels; determining, by the one or more processors, discrepancies between the corresponding first label and the corresponding second label for each of the one or more objects; generating, by the one or more processors using the determined discrepancies, a visual list of cells, where each of the cells is associated with an object having a discrepancy between its corresponding first label and its corresponding second label; and providing, by the one or more processors, the visual list of cells for display to a human operator.

The method may further comprise receiving, by the one or more processors, a request to group cells of the visual list of cells by the first corresponding label; in response to the request, regenerating, by the one or more processors, the visual list of cells, where cells of the regenerated visual list of cells are organized in rows and cells having the same first corresponding label are displayed in the same row; and providing, by the one or more processors, the regenerated visual list of cells for display to the human operator.

The method may further comprise receiving, by the one or more processors, a request to group cells of the visual list of cells by a number of points in the object associated with the cell; in response to the receiving the request, regenerating, by the one or more processors, the visual list of cells, where cells of the regenerated visual list of cells are organized in rows and cells whose associated object having a number of points falling within a same predetermined range are displayed in the same row; and providing, by the one or more processors, the regenerated visual list for display.

The method may further comprise, in response to the providing the visual list of cells for display, receiving, by the one or more processors, an user input selecting a cell; and providing, by the one or more processors for display to the human operator, a graphical representation of one or more features in metadata of the object associated with the selected cell.

The first set of labels may be generated using an object detection model, and the second set of labels may be created manually by a human operator. The method may further comprise, in response to the providing the visual list of cells for display, receiving, by the one or more processors, an user input selecting a cell; and in response to receiving the user input, providing, by the one or more processors, metadata of the object associated with the selected cell for display to the human operator. The method may further comprise, in response to the providing the visual list of cells for display, receiving, by the one or more processors, an user input selecting a cell; in response to the received user input, providing, by the one or more processors, an interactive visual representation of the object associated with the selected cell for display, wherein the interactive visual representation includes a plurality of images taken from different sensor angles corresponding to a plurality of views of the object; receiving, by the one or more processors, a user selection of one of the plurality of views of the object; and providing, by the one or more processors, the selected view of the object for display to the human operator.

The first set of labels may be generated by a first object detection model, and the second set of labels may be generated by a second object detection model, wherein the first object detection model may be different from the second object detection model.

BRIEF DESCRIPTION OF THE DRAWINGS

FIGS. 4C and 4D are example sets of labels in accordance with aspects of the disclosure.

DETAILED DESCRIPTION

Overview

Figure 1:
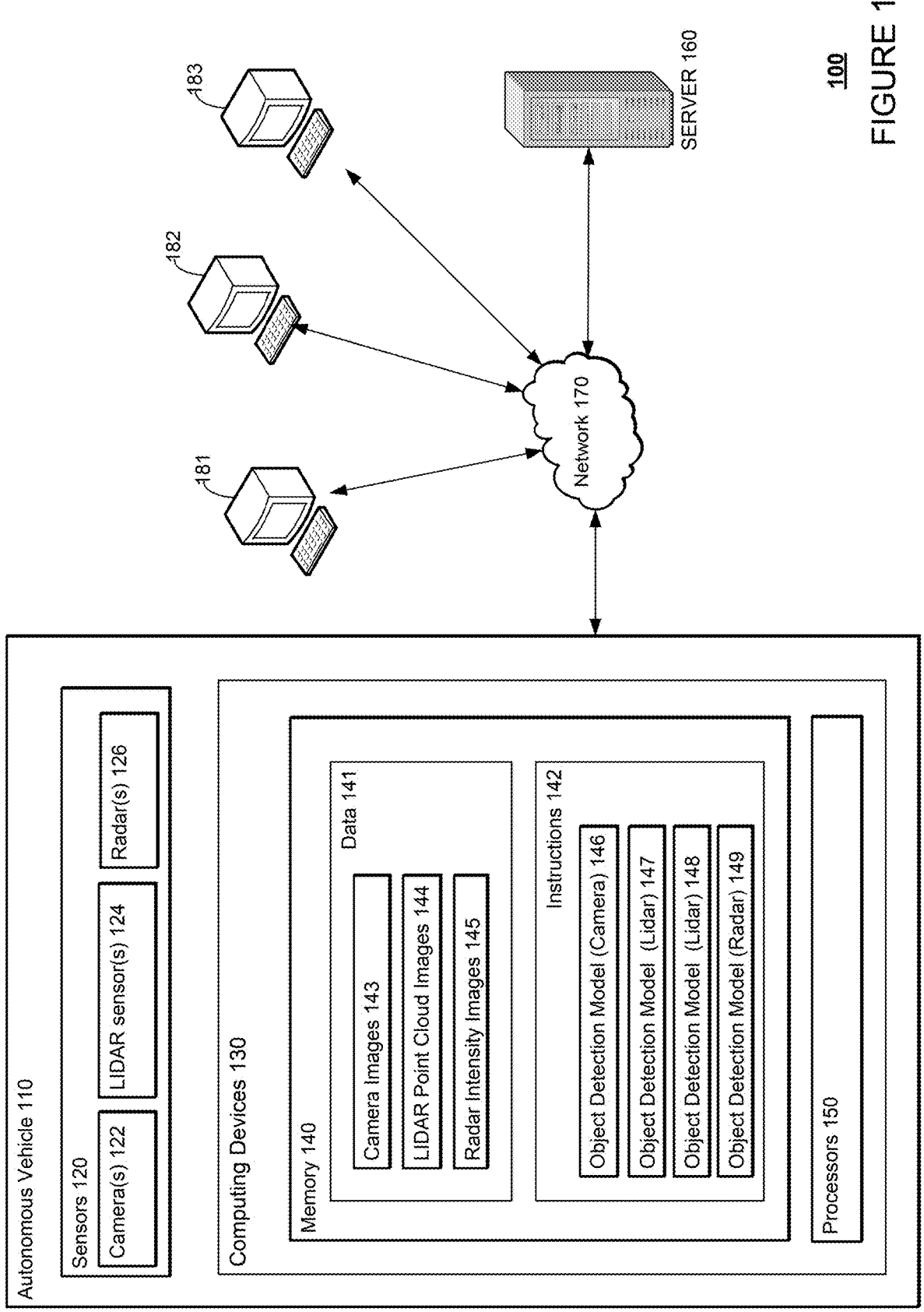
FIG. 1 is a functional diagram of an example system in accordance with aspects of the disclosure.

The technology generally relates to providing a visual interface for reviewing various information, including, for example labels generated by one or more models, labels generated by human operators or reviewers, and/or associated metadata. For instance, in order to safely control an autonomous vehicle, the vehicle's perception system may use sensors to detect and identify objects. The objects may be identified using various models that can be trained using human generated labels. In order to ensure the accuracy of this labeling, the labels generated by the models and/or human operators must be reviewed. However, manually reviewing these labels may be difficult and time consuming, particularly in instances where the number of objects or the number of scenes is large, and where each object has more than one labels generated by different labeling sources.

For instance, labels may be generated one scene at a time. For instance, a perception system of a vehicle may use various sensors, including LIDAR sensors to scan the vehicle's environment. One or more scans of a LIDAR sensor may generate sensor data or images corresponding to a single "scene." Because several scans may occur in a single second, a few seconds may result in a large number of scenes.

While most of the labels in each scene may be correct, a minority may be inaccurate in some way, but manually reviewing all labels scene-by-scene is a slow and very inefficient. To address this, a grid of cells may be displayed in order to facilitate faster review. Each of the cells is associated with one of the objects in one of the scenes and is associated with one or more labels for that object. This way, labels may be reviewed on a per object basis, rather than a per scene basis. Further, searching, filtering, and sorting may also be applied on a per object basis, which facilitates pattern finding.

For instance, each scene may be analyzed by one or more models, such as a model of the perception system or another object detection model, in order to generate a first set of labels for any perceived objects within those scenes. Each object may be associated with a bounding box identifying all of the LIDAR sensor data points corresponding to that object. In addition, these scenes and bounding boxes may be reviewed by a human operator in order to identify a second set of labels for objects identified by the human operator. The second set of labels may also be subject to a number of different levels of review by other human operators in order to ensure that the labels are as accurate as possible. Alternatively, the second set of labels may be generated by a model different from the model that generated the first set of labels.

These sets of labels, bounding boxes, and in some instances, the scenes (i.e. the sensor data of the scenes) themselves may be stored and accessed by a computing system in order to allow for review of discrepancies between labels for the same object. For instance, the system may receive a request for data identifying objects with labels that have discrepancies. In response, the system may access the stored set of labels and bounding boxes in order to identify any discrepancies. This may include, for example identifying any pairs of labels from the first and second set of labels for the same bounding box where the labels of the pair are different from one another.

Once the discrepancies are identified, the system may generate and display a grid of cells based on the discrepancies. For instance, each of the cells may be associated with one of the objects and/or the bounding boxes identified as having a discrepancy in its labels. In addition, each grid may be associated with a first label from the first set of labels and the corresponding second label from the second set of labels for the object. These labels may be displayed in the cells of the grid, or may be displayed by interacting with the cells. Each of the cells may also show a visual representation of the sensor data for the object. The grid may be of any size, and may be increased or decreased as needed depending upon the number of objects to be shown. The user may select a next grid of cells for viewing.

The system may provide the user with a number of ways to search the cells in the grid, including by any of the features in the metadata of the objects. For instance, the cells may be searched by values of the labels. For another instance, cells may also be searched by specifying a particular type of discrepancy between the first label and the second label. In addition or as alternative to searching, the system may also provide a number of ways to filter and sort the cells displayed in the grid. As such, the user may use searching, filtering, and sorting to quickly identify patterns in label discrepancies.

By providing the searching, filtering, and/or sorting options, the technology may be used to identify weaknesses in the model where, as noted above, the first set of labels may be generated by a model, and the second set of labels may be generated manually by a human operator. For example, it may be determined that the model has difficulty distinguishing cars from trucks. Further, metadata may be extracted from the objects having such discrepancies for further training the model. Likewise, the options may also be used to make comparisons between models, where, as noted above, both the first set of labels and the second set of labels are generated by different models. In addition, these searching, filtering, and/or sorting options may also be used to facilitate review of the manually created labels for human error. As such, the user may review the labels and enter a corrected label in the selected cell.

The system may provide for additional user interactions with the cells in the grid for further explorations. For example, upon receiving a user selection of the cell, the system may be configured to display metadata of the object of the selected cell. The metadata may include the labels, probability distributions of the labels, timestamps, color, lighting, as well as information for the bounding box for that object such as locations, distances (such as distance from the vehicle), dimensions, elevations, number of points, etc. For another example, once the user has identified a set of objects for further investigation, the user may want to compare the set of objects to determine patterns and anomalies. In this regard, where LIDAR point clouds are displayed in the cells, upon receiving a user input, the system may allow the user to view the LIDAR points of the object from different sensor angles. These visualization tools can therefore help the user, in an exploratory/experimental manner, find anomalies and patterns that may have resulted in inaccurate labels.

As an alternative to displaying a grid of cells, the system may generate a web-based page for displaying a visual list of cells, where each cell is associated with one of the objects and/or the bounding boxes identified as having a discrepancy in its labels. For example, the user may scroll down or move to a next page to see more cells. The system may also provide the searching, filtering, and sorting options, as well as the visualization tools described above. Additionally or alternatively, the system may provide a number of ways to group the cells in the visual list by one or more criteria. For example, each group of cells may be displayed in the same row or column. This way, patterns can be more easily visualized.

The technology described herein may provide a user-friendly visual interface for reviewing labels generated for objects perceived in many scenes captured by a vehicle's perception system. The technology provides searching tools, which facilitates comparison of the labels created by human operators and/or models. The technology further provides filtering, sorting, and grouping tools, which may help human operators to find patterns in label discrepancies. The technology still further provide visualization tools for users to find anomalies and patterns in an exploratory manner. This, in turn, may enable engineers to identify particular weaknesses of the models for further training.

Example Systems

FIG. 1 illustrates an example system 100 for generating and reviewing labels according to aspects of the disclosure. The system 100 includes an autonomous vehicle 110 configured to communicate with a server 160. The autonomous vehicle 110 may be configured to operate autonomously, that is, drive without the assistance of a human driver. While certain aspects of the disclosure are particularly useful in connection with specific types of vehicles, the autonomous vehicle 110 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

The autonomous vehicle 110 may be equipped with various types of sensors 120 for detecting objects near and/or around with the autonomous vehicle 110. For example, the autonomous vehicle 110 may be equipped with one or more cameras 122 for capturing images of objects in front of and/or behind the autonomous vehicle 110. As another example, the autonomous vehicle 110 may be equipped with one or more LIDAR sensors 124 for detecting objects near and/or around the autonomous vehicle 110. For instance, the one or more LIDAR sensors 124 may perform a 360° scan around the autonomous vehicle 110, one or more such scans may correspond to a "scene" observed by the autonomous vehicle 110. As still another example, the autonomous vehicle 110 may be equipped with one or more radars 126 for detecting objects near and/or around the autonomous vehicle 110. While FIG. 1 illustrates that the autonomous vehicle 110 may be equipped with one or more cameras 122, one or more LIDAR sensors 124, and one or more radars 126, the autonomous vehicle 110 may be equipped with alternative arrangements of sensors. For example, the autonomous vehicle 110 may be equipped with sonar technology, infrared technology, accelerometers, gyroscopes, magnetometers, or any other type of sensor for detecting objects near and/or around the autonomous vehicle 110.

Figure 2:
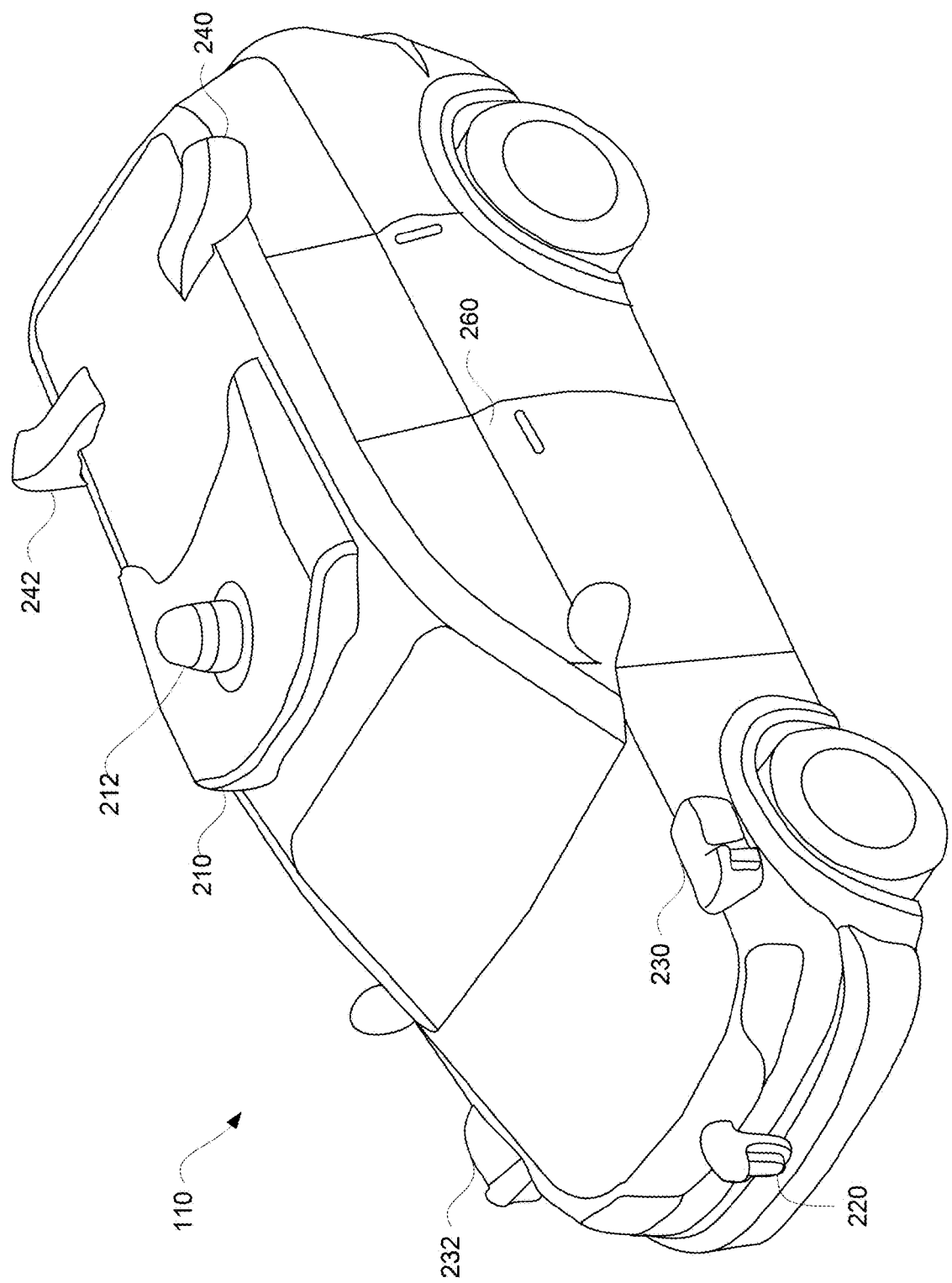
FIG. 2 is an example external view of a vehicle in accordance with aspects of the disclosure.

For instance, FIG. 2 is an example external view of autonomous vehicle 110 with various sensors. In this example, roof-top housing 210 and dome housing 212 may include a LIDAR sensor as well as various cameras and radar units. In addition, housing 220 located at the front end of autonomous vehicle 110 and housings 230, 232 on the driver's and passenger's sides of the vehicle may each store a LIDAR sensor. For example, housing 230 is located in front of driver door 260. Autonomous vehicle 110 also includes housings 240, 242 for radar units and/or cameras also located on the roof of autonomous vehicle 110. Additional radar units and cameras (not shown) may be located at the front and rear ends of autonomous vehicle 110 and/or on other positions along the roof or roof-top housing 210.

Referring back to FIG. 1, the autonomous vehicle 110 may include one or more computing devices, such as computing devices 130 containing memory 140, one or more processors 150, and other components typically present in general purpose computing devices.

The memory 140 stores information accessible by the one or more processors 150, including data 141 and instructions 142 that may be executed or otherwise used by the processors 150. The memory 140 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 141 may be retrieved, stored or modified by processor 150, for example in accordance with the instructions 142. For instance, although the claimed subject matter is not limited by any particular data structure, the data 141 may be stored in computing device registers, in a relational database as a table having a plurality of different fields and records, XML documents or flat files. The data 141 may also be formatted in any computing device-readable format.

The memory 140 may store in data 141 one or more images 143-145 captured by one or more of the sensors 120. The captured images may include camera images 143 captured using the one or more cameras 122, LIDAR point cloud images 144 captured using the one or more LIDAR sensors 124, and/or radar intensity images 145 captured using the one or more radars 126. Depending on the type of sensors used by the autonomous vehicle 110, the memory 140 may store other types of images in data 141. Metadata associated with the one or more images 143-145 may also be stored along with the captured images. The images 143-145 may be formatted in any computer-readable format. For example, the images 143-145 data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics.

The camera images 143 may include one, two, or three-dimensional images having a predetermined number of megapixels. The camera images 143 may further be in color, black and white, or in any other format. The one or more cameras 122 may be configured to capture the one or more camera image(s) 143 at predetermined time intervals, such as every millisecond, every second, every minute, or at any other interval of time. Other measurements of capturing images may also be possible, such as 30 frames per second ("fps") 60 fps, or any other measurement.

The LIDAR point cloud images 144 may include one or more images comprised of LIDAR points representing a predetermined view angle near and/or around the autonomous vehicle 110. For example, the LIDAR point cloud images 144 may include one or more 360° scans of the environment around the autonomous vehicle 110, where each 360° scan may be considered a scene perceived by the vehicle. Depending on the features of the LIDAR sensors that generated the images, LIDAR point cloud images 144 may include a predetermined number of LIDAR points, such as 50,000 LIDAR points, 80,000 LIDAR points, 100,000 LIDAR points, or any other number of LIDAR points. As with the camera images 143, the autonomous vehicle 110 may be configured to capture the one or more LIDAR point cloud images 144 at predetermined time intervals, such as 10 fps, 30 fps, every millisecond, every second, or at any other interval of time.

Figure 4A:
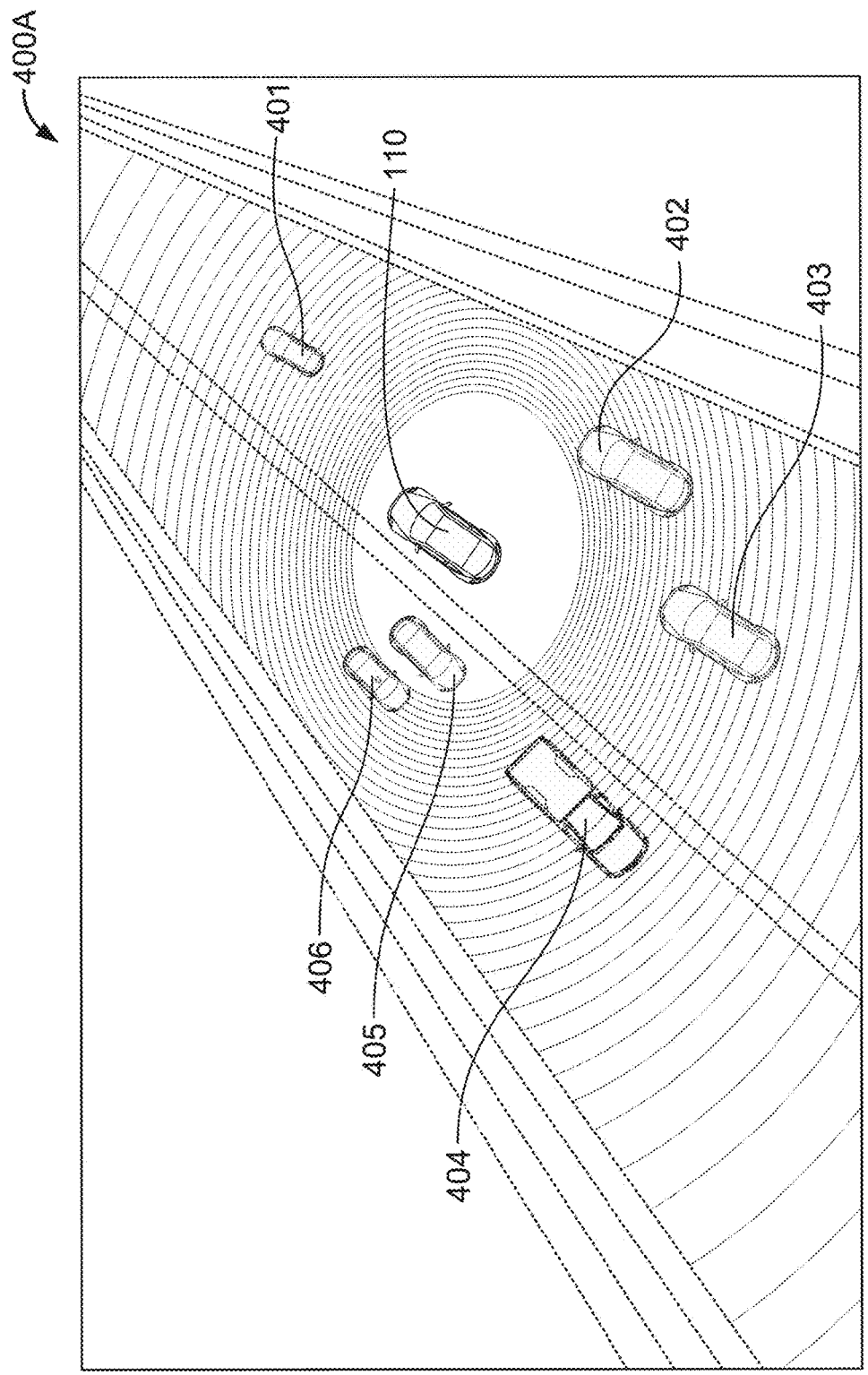
FIG. 4A is an example LIDAR point cloud image in accordance with aspects of the disclosure.

For instance, FIG. 4A shows an example LIDAR point cloud image 400A that may be captured by the one or more LIDAR sensors 124 of the autonomous vehicle 110. The LIDAR point cloud image 400A shows a 360° view of a scene perceived by the autonomous vehicle 110. In this scene, the autonomous vehicle 110 is driving in a two-lane road. Various objects 401, 402, 403, 404, 405, and 406 are shown in the image, which may correspond to vehicles driving around the autonomous vehicle 110. Metadata may be associated with the LIDAR point cloud image 400A, and in some examples may be displayed along with the LIDAR point cloud image 400A.

Depending on the positioning of the sensors 120, some of the sensors 120 may have overlapping fields of view. For example, some of the one or more cameras 122 and some of the one or more LIDAR sensors 124 may be positioned such that their fields of view overlap. Thus, though not shown in FIG. 4A, the LIDAR point cloud image 400A may substantially or approximately correspond to one or more camera images captured by the one or more cameras 122 of the autonomous vehicle 110. In some examples, the computing devices 130 of the autonomous vehicle 110 may correlate the various types of images taken by the sensors 120 in order to better reconstruct a scene. For example, images taken by the one or more cameras 122 and the LIDAR sensors 124 may be correlated by timestamps and view angles.

Referring back to FIG. 1, the radar intensity images 145 may include one or more images captured using a radar technology. As with the LIDAR point cloud images 144 or the camera images 143, the radar intensity images 145 may be captured at predetermined time intervals.

The instructions 142 may be any set of instructions to be executed directly (such as machine code) or indirectly (such as scripts) by the processors 150. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The memory 140 may store various object detection models, such as object detection models 146-149 in the instructions 142. These object detection models 146-149 may be any configuration of software and/or hardware configured to detect an object in an image, such as images 143-145 captured by one or more of the sensors 120. For example, as shown, the object detection model 146 may be configured to detect objects in camera images, the object detection models 147 and 148 may both be configured to detect objects in LIDAR point cloud images, and the object detection model 149 may be configured to detect objects in radar intensity images. Where more than one object detection models are configured to detect objects in the same types of images, such as object detection models 147 and 148, these object detection models 147 and 148 may include different algorithms such that in some instances, object detection models 147 and 148 may provide different output for the same data.

The object detection models 146-149 may be trained to use one or more image parameters to identify the objects, such as arrangement of pixels, LIDAR points, intensity maps, etc. In this regard, the object detection models 146-149 may be trained using images labeled by human operators. The object detection models 146-149 may be any type of trained model, such as a regression model, a classification model, a linear model, a boosting tree model, a random forest model, or a neural net model, etc. Where more than one object detection model are configured to detect objects in the same types of images, such as object detection models 147 and 148, these object detection models may be different types of models, or may be trained using different sets of labeled images, or may use different sets of image parameters.

In this regard, each of the sensor types may be associated with a corresponding set of image parameters. Examples of camera parameters may include the minimal brightness of a pedestrian, the minimum pixel size of a car object, the minimum width of a car object, and other such parameters. Examples of LIDAR parameters may include the height of a pedestrian, the length of a car object, an obstacle detection threshold, and other such parameters. Examples of radar parameters may include minimum distance to an object, a delay threshold for detecting an object, the height of a pedestrian, and other such parameters.

As an image is captured by the one or more of the sensors 120, the image may be communicated to the appropriate object detection models, such as one or more of the object detection models 146-149. One or more of the object detection models 146-149 may then analyze the image to determine whether there is an object present in the image. The objects in the captured image may be any type of object, such as a vehicle, pedestrian, a road sign, a traffic light, a traffic cone, or any other type of object.

When the object detection models 146-149 detect an object in an image, the object detection models 146-149 may generate one or more labels for the detected object. In this regard, the object detection models 146-149 may first generate a bounding box encompassing the object. The bounding box may be rectangular, oval, or any other shape. In addition, the label generated by the object detection models 146-149 may be associated with an image number that identifies the image in which the detected object may be located. As a moving object may be located in a number of images, such as a moving vehicle, the moving object may appear in different locations in different images. Hence, the moving object may have a number of different labels associated with it, and each of the labels may be associated with a corresponding image number to identify the location of the moving object across multiple images.

For instance, a LIDAR point cloud image representing a scene may be analyzed by the object detection model 147 to identify objects perceived within the scene, bounding boxes for those objects, as well as to generate a first set of labels for these perceived objects. For instance, each object may be associated with a bounding box identifying all of the LIDAR sensor data points corresponding to that object. Additionally or alternatively, the LIDAR point cloud image representing the scene may also be analyzed by the object detection model 148 to identify objects perceived within the scene, and to generate a second set of labels for the perceived objects. As discussed above, since object detection models 147 and 148 may include different algorithms, or may have been trained with different sets of labeled images or to use different image parameters to identify objects, there may be discrepancies between the first set of labels and the second set of labels.

For instance, the object detection model 147 may also generate bounding boxes as well as a first set of labels for each of the objects 401-406. For example, referring to FIG. 4C, objects 401, 402, 403, 405, and 406 may be labeled as "CAR," while object 404 may be labeled as "TRUCK."

Additionally or alternatively, the object detection model 148 may also be used, for instance by computing devices 130 and/or server 160 (discussed further below) to analyze the LIDAR point cloud image 400A, for example by generating another set of bounding boxes and a second set of labels for each of the objects 401-406, or generate the second set of labels based on the bounding boxes already generated by the objection detection model 147. As mentioned above, there may be discrepancies between the first set and second set of labels. For example, referring to FIG. 4D, the object detection model 148 may label object 401 as "LAWN MOWER," and 402-406 as "CAR." Metadata associated with the LIDAR point cloud image 400A (now labeled) may now additionally include data on the bounding boxes, the first set and/or the second set of labels, and various parameter values for generating the labels.

For example, FIG. 4C shows an example 400C of the first set of labels 450 generated by the object detection model 147 and the second set of labels 460 generated by the object detection model 148. Optionally, one or both of the object detection models 147 and 148 may also generate a probability distribution and/or a classification score when generating the labels. For example, as shown, when generating a label for object 401, the object detection model 147 may first generate a probability distribution 452 for each possible label for object 401. The label with the highest probability is thus chosen as the first label for object 401, with a classification score 454 equal to the probability for that label. Likewise, when generating a label for object 401, the object detection model 148 may also first generate a probability distribution 462 for each possible label. The label with the highest probability is thus chosen as the second label for object 401, with a classification score 464 equal to the probability for that label.

Figure 4B:
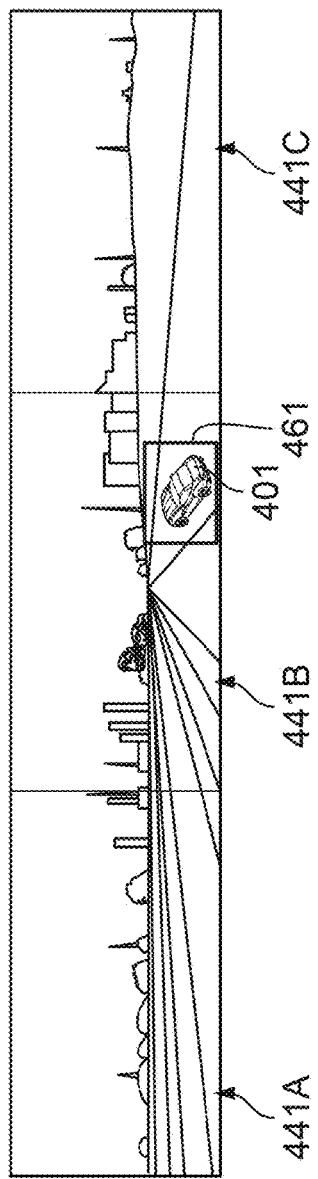
FIG. 4B is an example LIDAR point cloud image with bounding boxes and labels in accordance with aspects of the disclosure.

Referring to FIG. 4B, as mentioned above, one or more camera images captured by the one or more cameras 122 of the autonomous vehicle 110 may substantially or approximately correspond to the LIDAR cloud image. As shown, camera images 441A-C correspond to views of the autonomous vehicle 110 including the object 401. These camera images 441A-C may also be analyzed and labeled by an object detection model, such as object detection model 146 of the autonomous vehicle 110. The object detection model 146 may generate a bounding box 461 and a second label for the object 401. Although not shown, other camera images corresponding to other views of the autonomous vehicle 110 may include the other vehicles 402-406, and may also be analyzed by object detection model 146 to generate bounding boxes and corresponding second labels. Likewise, though not shown, one or more radar intensity images captured by the one or more radars 126 may also be analyzed and labeled by an object detection model, such as object detection model 149 of the vehicle.

Referring back to FIG. 1, the one or more processor 150 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 130 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 130. Accordingly, references to a processor or computing device will be understood to include references to a collection of processors or computing devices or memories that may or may not operate in parallel.

Computing devices 130 may also include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information). For example, the autonomous vehicle 110 may include an internal electronic display as well as one or more speakers to provide information or audio visual experiences. In this regard, internal electronic display may be located within a cabin of autonomous vehicle 110 and may be used by computing devices 130 to provide information to passengers within the autonomous vehicle 110.

Computing devices 130 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous vehicle 110 may be in communication with server computing devices, such as server 160, and/or one or more client devices 181-183. For example, such communication may be established via one or more networks, such as network 170. The network 170 may be implemented as any combination of networks. The network 170 may be various types of networks. As examples, the network may be a Wide Area Network ("WAN"), such as the Internet; a Local Area Network ("LAN"); a Personal Area Network ("PAN"), or a combination of WANs, LANs, and PANs. Moreover, the network 170 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of protocol.

The server 160 may be configured to generate various tools to allow operators to review the captured images and labels. The server 160 may generate a labeling application that allows the operators to review images 143-145 captured by sensors 120, and to manually identify objects in these images in order to create another set of labels for these identified objects. To allow human operators to create labels, the labeling application may display each image to the human operator. The human operator may then draw a bounding box or other shape, around an object in the image. Alternatively, the human operator may use the bounding boxes generated by the object detection models. The human operator may manually create a label for the object, such as "vehicle," "bicycle," "pedestrian," etc. Alternatively, the human operator may manually select the label from a drop-down menu or other graphical menu. The labeling application may then store the manually created label.

For example, continuing from the earlier example where a scene captured by the LIDAR sensor 124 was analyzed by the object detection model 147 to generate the first set of labels, the scene may be further reviewed by a human operator in order to manually create a second set of labels for the objects identified in the scene. For instance, the human operator may also review LIDAR point cloud image 400A to create a labeled LIDAR point cloud image. For instance, the human operator may draw bounding boxes around the objects 401-406 and then enter the second set of labels, or simply enter the second set of labels according to the bounding boxes generated by the object detection model 147. As with the case where the two set of labels are generated by two different object detection models, there may be discrepancies between the model generated and the manually created labels. For example, the human operator may label object 401-404 as "CAR," 405 as "TRUCK," and 406 as "EMERGENCY VEHICLE." Metadata associated with the LIDAR point cloud image 400A (now labeled) may appended with the manually created bounding boxes and/or labels. In some instances, the second set of labels may also be subject to a number of different levels of review by other human operators in order to ensure that the labels are as accurate as possible. In such instances, the second set of manually created labels may be considered as "ground truths" for training object detection models, such as object detection models 146-149.

For example, FIG. 4D shows an example 400D of the first set of labels 450 generated by object detection model 147 and the second set of labels 470 manually generated by a human operator. As discussed with respect to FIG. 4C, optionally the object detection model 147 may generate a probability distribution 452 and/or a classification score 454 when generating the first set of labels. However, where manually created labels are reviewed by multiple human operators and can be considered as ground truths, there is no need to create a probability distribution or classification score, since it may be assumed that the manually created label is correct (classification score=1).

The server 160 may further be configured to generate one or more visual analysis tools that allow human operators to review the labels generated by various object detection models, such as object detection models 146-149, as well as labels manually created by human operators. Such visual analysis tools may include one or more grids of cells, or one or more visual lists on one or more web-based pages. The implementation of the server 160 to generate such grids and lists are discussed with reference to FIGS. 3 and 5-9D.

The human operators and human operators may review the images and labels directly at the server 160, or indirectly through the client devices 181-183. The client devices 181-183 in communication with the server 160 may be any type of client device. As examples, and without limitation, the client devices 181-183 may include one or more desktop computers and one or more mobile devices. Examples of a mobile device include a desktop, laptop, a smart phone, a tablet computer, or other such mobile device. Accordingly, a human operator may communicate and interact with the server 160 regardless of whether the client devices 181-183 are desktop computers, mobile devices (e.g., laptops, smartphones, PDAs, etc.), or any other such client device.

Figure 3:
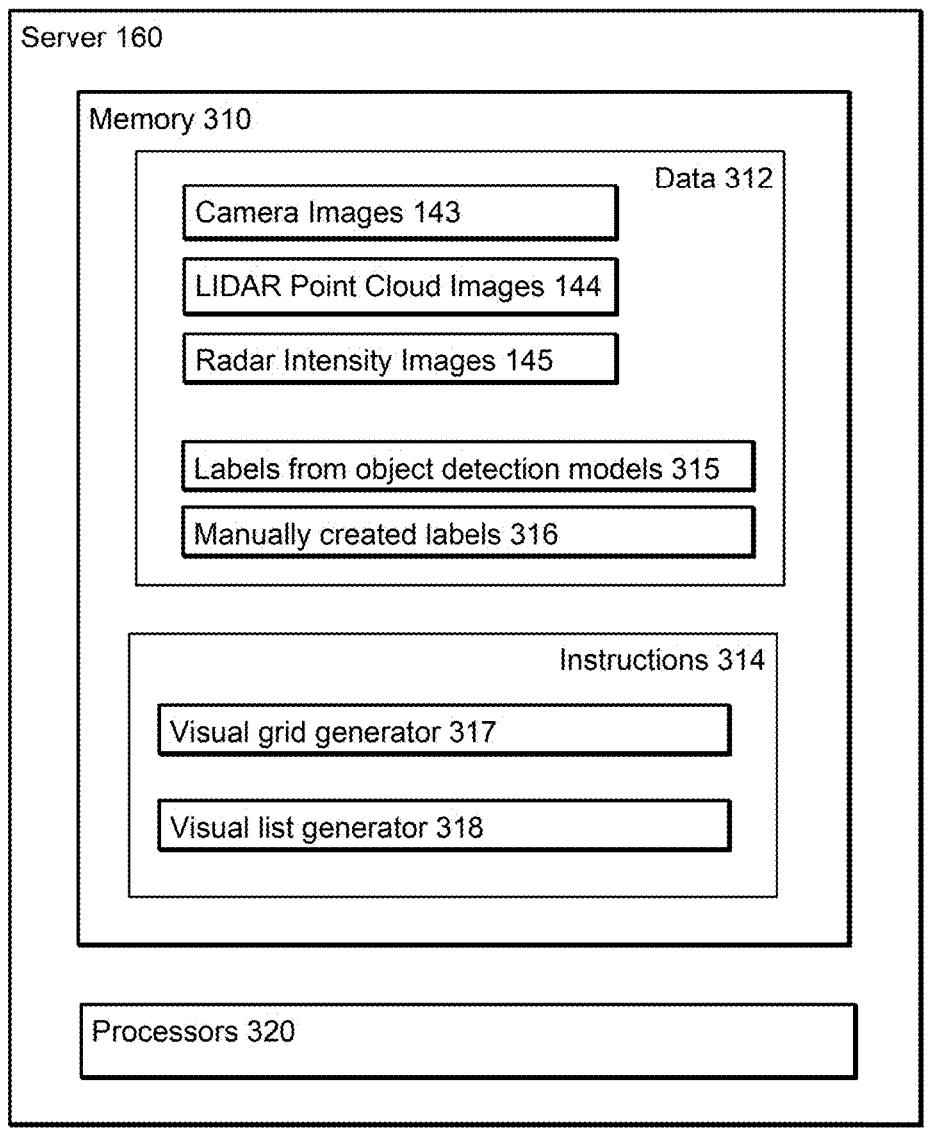
FIG. 3 is an example server in accordance with aspects of the disclosure.

FIG. 3 illustrates one example of the server 160 according to aspects of the disclosure. The server 160 may include a memory 310 and one or more processors 320. The memory 310 may be any type, such as random access memory ("RAM"), read-only memory ("ROM"), hard disks, floppy disks, CD-ROMs, flash memory or other types of computer memory. In addition, the memory 310 may be distributed across many different types of computer-readable media. The processors 320 may be a microprocessor, a microcontroller, a DSP, an ASIC, discrete analog or digital circuitry, or a combination of other types of circuits or logic. In addition, the processors 320 may be distributed across many different types of processors.

The memory 310 may store various types of data 312. For example, the server 160 may receive from autonomous vehicle 110 captured images, such as images 143-145 captured by sensors 120. The server 160 may also receive metadata associated with these images. The server 160 may store these received images and/or the associated metadata to data 312. For another example, the server 160 may receive from autonomous vehicle 110 labels generated by objection detection models 315, such as object detection models 146-149. The server 160 may also receive parameter values used to generate these labels, and/or probability distribution and classification score for these labels. The server 160 may store these labels 315 and parameter values in the data 312. For still another example, the server 160 may receive from human operators, for example through client devices such as client devices 181-183, manually created labels 316. The server 160 may further store these manually created labels 316 in the data 312.

The memory 310 may also store instructions 314 executable by the processor 320. For instance, the instructions 314 may include instructions to generate various visual analysis tools that allow human operators to visualize and analyze labels generated by different labeling sources, such as the object detection models 146-149, and human operators. For example, where the first set of labels was generated by the object detection model 147 for a scene captured by LIDAR sensor 124, and the second set of labels were manually created by a human operator, the human operator may review one or both sets of labels for inaccuracies. If the human operator identifies inaccuracies in the first set of labels, the human operator may want to send metadata associated with the mislabeled image to the autonomous vehicle 110 as training data for the object detection model 147. If the human operator identifies inaccuracies in the second set of labels, the human operator may want to enter a corrected label. As another example, where the first set of labels was generated by the object detection model 147 and the second set of labels was generated by the object detection model 148, the human operator may likewise review both sets of labels for inaccuracies, and send metadata associated with any mislabeled image to one or both of the object detection models.

Figure 5:
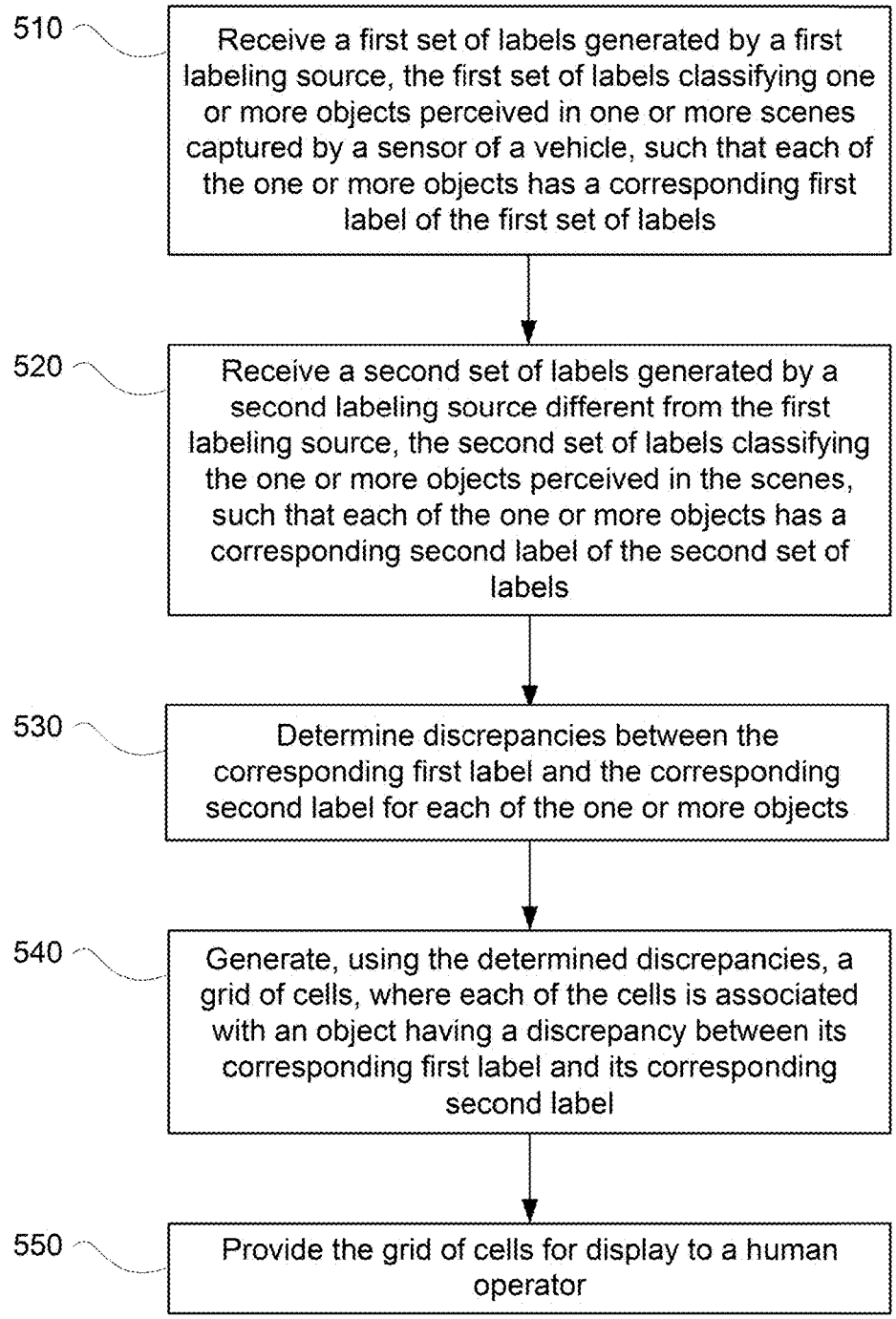
FIG. 5 is an example flow diagram in accordance with aspects of the disclosure.

In this regard, while most of the labels in each scene may be correct, a minority may be inaccurate in some way, which makes reviewing all the labels scene-by-scene very inefficient. This is particularly true if there are a large number of scenes or a large number of objects perceived in each scene, and when there are multiple sets of labels from multiple labeling sources. To address this, the processors 320 may execute a visual grid generator 317 in order to generate a grid of cells where each of the cells is associated with one of the objects in one of the scenes and is associated with one or more labels for that object. This way, labels may be reviewed on a per object basis, rather than a per scene basis. Further, searching, filtering, and sorting may also be applied on a per object basis, which facilitates pattern finding. In this regard, FIG. 5 shows an example method for generating an example grid, and FIGS. 6A-7C show examples of grids.

Figure 8:
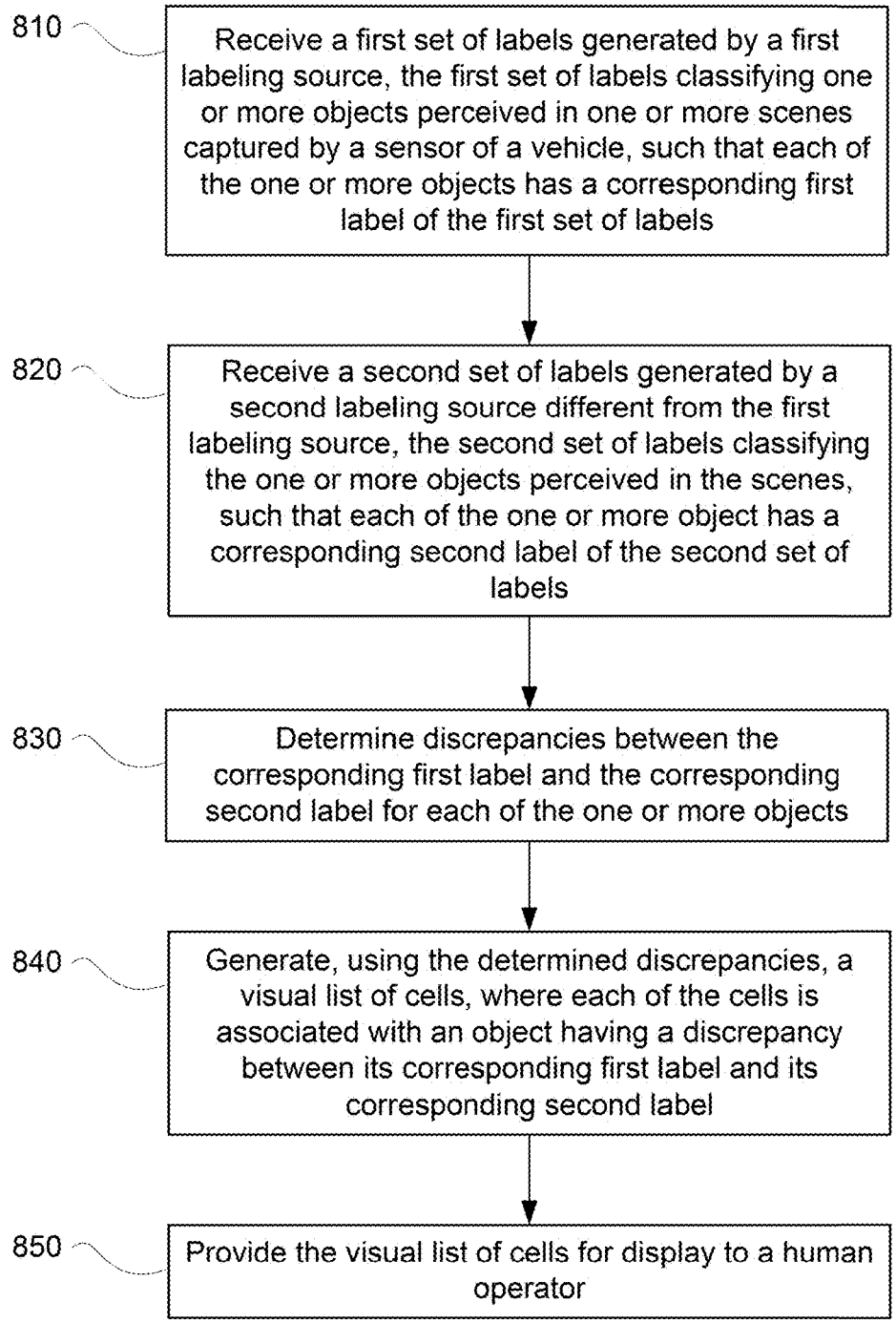
FIG. 8 is another example flow diagram in accordance with aspects of the disclosure.

Alternatively, the processors 320 may execute a visual list generator 318 in order to generate a visual list of cells to be displayed on a web-based page, where each of the cells is associated with one of the objects in one of the scenes and is associated with one or more labels for that object. Likewise, in such a visual list, the labels may be reviewed on a per object basis, rather than a per scene basis. Searching, filtering, and sorting may be applied as for the visual grid. Further, grouping options may also be applied to further facilitate pattern finding. In this regard, FIG. 8 shows an example method for generating an example visual list, and FIGS. 9A-9D show examples of visual lists.

Although shown as a single block, the server 160 may be implemented in a single system or partitioned across multiple systems. In addition, one or more of the components of the server 160 may be implemented in a combination of software and hardware. In addition, any one of the components of the server 160 may be implemented in a computer programming language, such as C #, C++, JAVA or any other computer programming language. Similarly, any one of these components may be implemented in a computer scripting language, such as JavaScript, PHP, ASP, or any other computer scripting language.

Furthermore, any one of these components may be implemented using a combination of computer programming languages and computer scripting languages.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted.

FIG. 5 is an example flow diagram 500 in accordance with aspects of the disclosure which may be performed by one or more processors of one or more computing devices, such as the processors 320 of server 160, in order to generate a grid for reviewing and analyzing labels generated by different labeling sources.

In block 510, a first set of labels generated by a first labeling source is received, the first set of labels classifying one or more objects perceived in one or more scenes captured by a sensor of a vehicle, such that each of the one or more objects has a corresponding first label of the first set of labels. For instance, as described above in relation to the example systems, the processors 320 of the server 160 may receive from the autonomous vehicle 110 the first set of labels generated using the object detection model 147. The first set of labels may classify the objects perceived in one or more scenes captured by the one or more LIDAR sensors 124, camera images, and/or radar data. For example, as shown in FIGS. 4C and 4D, the first set of labels for LIDAR point cloud image includes a corresponding first label for each of the objects 401-406 in that image.

In block 520, a second set of labels generated by a second labeling source different from the first labeling source is received, the second set of labels classifying the one or more objects perceived in the scenes, such that each of the one or more objects has a corresponding second label of the second set of labels. For instance, the processors 320 of the server 160 may receive from the autonomous vehicle 110 the second set of labels generated using the object detection model 148. Alternatively, the server may receive the second set of labels generated by a human operator, for example through a client computing device such as 181-183. The second set of labels may classify the objects perceived in the one or more scenes captured by the one or more LIDAR sensors 124, camera images, and/or radar data. For example, as shown in FIGS. 4C and 4D, the second set of labels for LIDAR point cloud image 400A includes a corresponding second label for each of the objects 401-406 in that image.

In block 530, discrepancies between the corresponding first label and the corresponding second label for each of the one or more objects are determined. As discussed above in relation to the example systems, the sets of labels, bounding boxes, and in some instances, the images and associated metadata may be stored in the memory 310 of the server 160 and accessed by the processors 320 of the server 160 in order to allow for review of discrepancies between labels for the same object. For instance, the processors 320 may receive a request for data identifying objects with labels that have discrepancies, for example from a human operator interacting with the server 160 or with a client device (such as client devices 181-183).

In response, the processors 320 of the server 160 may access the sets of labels and bounding boxes stored in the memory 310 in order to identify any discrepancies. This may include, for example, identifying any pairs of labels from the first and second set of labels for the same bounding box where the labels of the pair are different from one another. For instance, referring to FIGS. 4C and 4D, the processors 320 may access the bounding boxes generated for objects 401-406, as well as the first set of labels and the second set of labels generated for objects 401-406, then determine the corresponding first label and the corresponding second label for each of the objects 401-406. For instance, referring to FIG. 4C where the first and second set of labels were respectively generated by object detection models 147 and 148, the processors 320 may determine the corresponding first label for object 404 is "TRUCK" and the corresponding second label for object 404 is "CAR." The processors 320 can thus determine that there is a discrepancy for the corresponding first label and the corresponding second label for object 404.

In other examples, the processors 320 can also use the bounding boxes to determine that there is a corresponding first label but no corresponding second label for an object, or vice versa. In still other examples, where the object detection models 147 and 148 each generated a set of bounding boxes along with the sets of labels, the processors 320 can also first determine which two bounding boxes correspond to the same object in the image, and then determine the corresponding first and second labels for the object. For example, the bounding box generated by the object detection model 147 and the bounding box generated by the object detection model 148 for the same object may substantially overlap.

In block 540, a grid of cells is generated using the determined discrepancies, where each of the cells is associated with an object having a discrepancy between its corresponding first label and its corresponding second label. For instance, the processors 320 of the server 160 may generate a grid of cells using the discrepancies determined in block 530, along with the sets of labels, bounding boxes, and/or associated metadata stored in the memory 310. For instance, the processors 320 may generate a grid of cells, where each cell corresponds to an object having a label discrepancy. For example, referring to FIG. 4C, where the first and second set of labels were respectively generated by object detection models 147 and 148, a first cell may be generated for object 401 since its corresponding first label is "CAR" and its corresponding second label is "LAWN MOWER," and a second cell may be generated for object 404 since its corresponding first label is "TRUCK" and its corresponding second label is "CAR." For another example, referring to FIG. 4D, where the first set of labels was generated by object detection model 147 and the second set of labels was generated by a human operator, one cell may be generated for object 406 since its corresponding first label is "CAR" and its corresponding second label is "EMERGENCY VEHICLE." As such, each cell in the grid may be associated with one of the objects (and/or the bounding boxes) identified as having a discrepancy in its labels, and each cell in the grid may be associated with a corresponding first label and a corresponding second label for the object.

In block 550, the grid of cells is provided for display. For example, the grid of cells may be displayed on a display of the server 160, or sent via network 170 for display to a human operator on a display of a client device, such as client devices 181-183. The cells may be blank, or contain information and/or visual representations. For example, the cells may display an image/scene number or a timestamp. For another example, the corresponding labels may be displayed in the cells of the grid, or may be displayed by interacting with the cells (such as click to open).

Figure 6A:
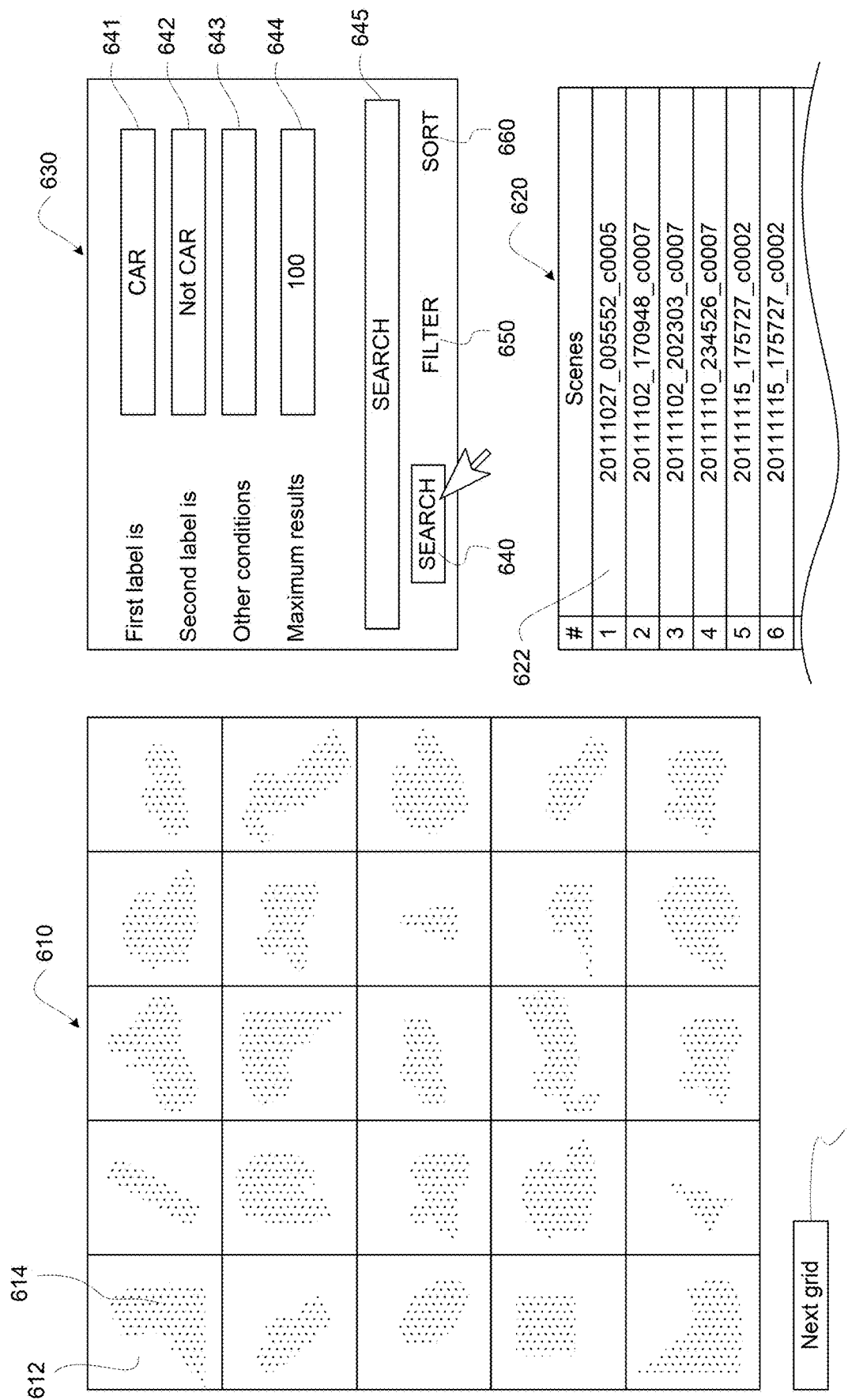
FIGS. 6A-6C show an example grid in accordance with aspects of the disclosure.
Figure 6B:
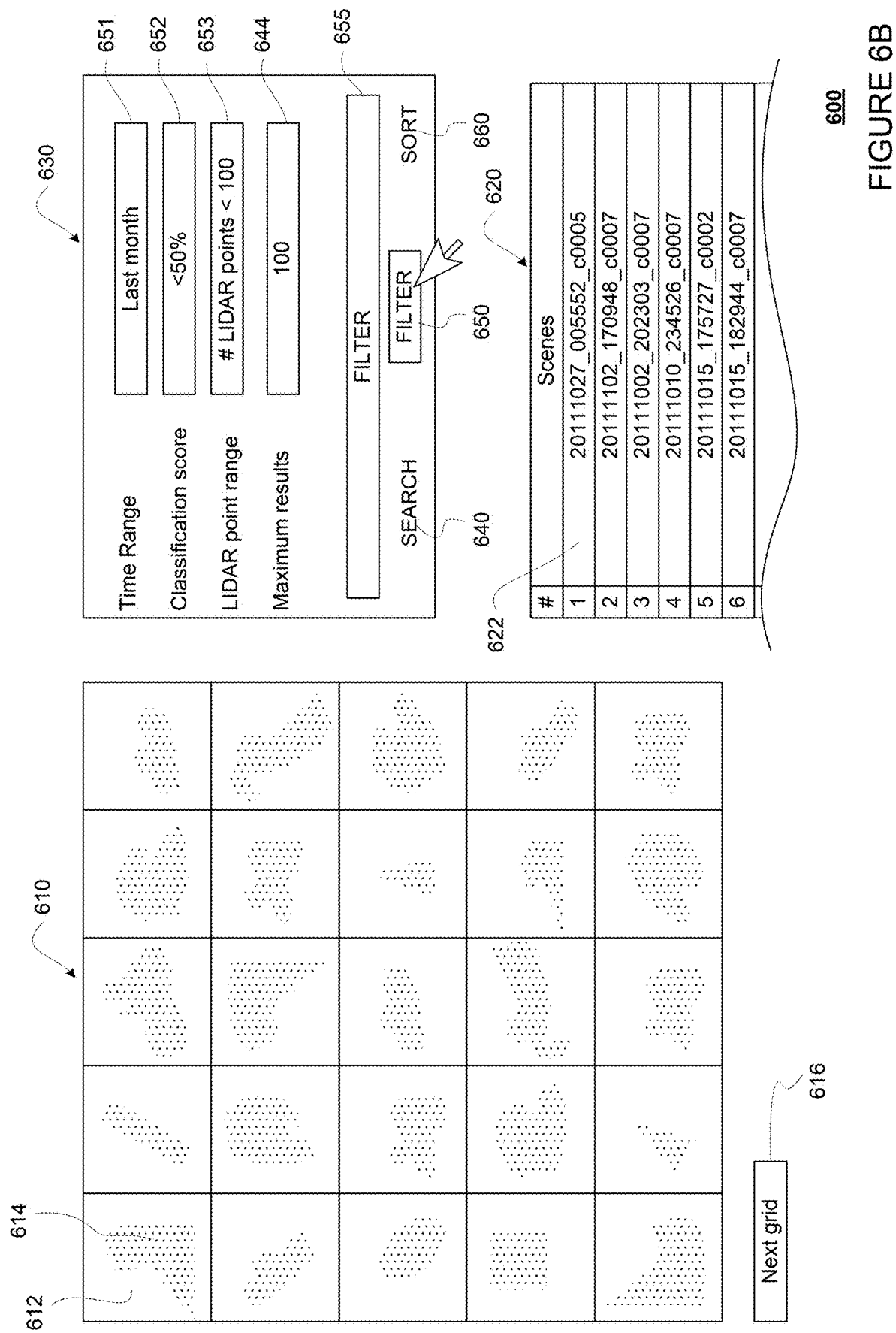
Figure 6C:
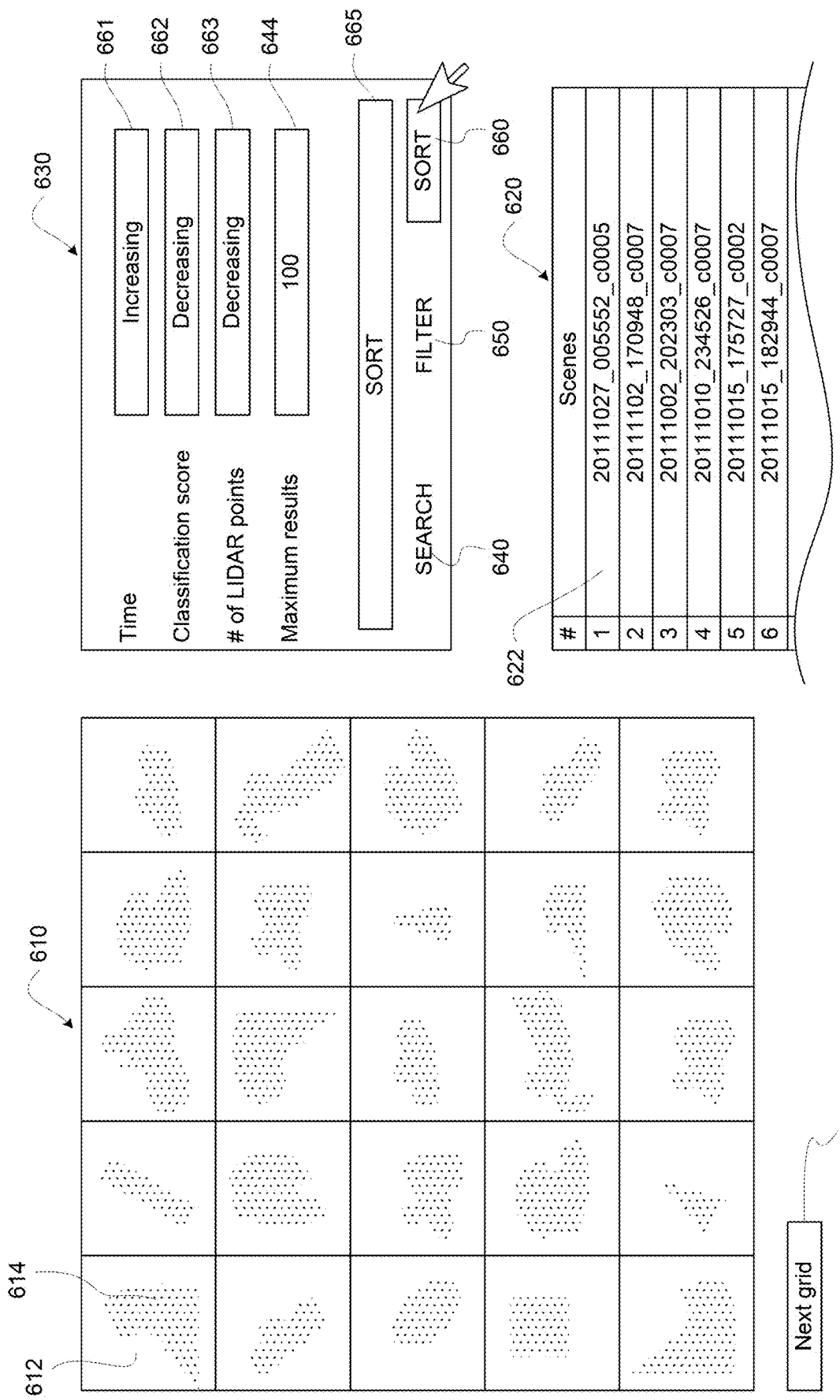

FIGS. 6A-6C show an example interface 600 displaying an example grid, including various analysis tools. FIG. 6A shows the interface 600 when a search tool is selected. FIG. 6B shows the interface 600 when a filtering tool is selected. FIG. 6C shows the interface 600 with a sorting tool is selected.

FIG. 6A shows an example view of interface 600 displaying an example grid 610.

For example, the interface 600 may be stored on the server 160 or a client device, such as client devices 181-183. The grid 610 are made of cells, such as cell 612. The cell 612, and all the other cells in the grid 610 are associated with an object that has a labeling discrepancy. For instance, if grid 610 is created for FIG. 4C, objects 401 and 404 would each be associated with a cell in the grid 610. For another instance, if grid 610 is created for FIG. 4D, object 406 would be associated with a cell in the grid 610. As such, the grid 610 provides a quick and easy way for a human operator to go through the objects that have label discrepancies, where one or more of the labels is likely wrong. Conversely, objects with no label discrepancies would be omitted from the grid 610. In this regard, the human operator would not need to waste time looking through the many objects in each scene that are consistently labeled by two labeling sources, where both labels are likely correct. The grid 610 therefore improves the human operator's experience and efficiency.

Although shown as a 5×5 grid of cells, the grid 610 may be of any size, such as 10×10, 10×20, 20×20, etc. The size of the grid 610 may be increased or decreased as needed depending upon the number of objects to be shown. For example, if the number of objects to be shown is 98, the grid may be 10×10 in size. For another example, if the number of objects to be shown is 200, the grid may be 10×20 in size. In some examples, the grid size may be configurable by a user, for example by entering a desired grid size, selecting a predetermined grid size from a drop down menu, or dragging the grid 610 to change its size. The user may select a next grid of cells for viewing, for example by scrolling or selecting (for instance using a touch screen and finger or stylus and/or using a mouse pointer) on next grid 616.

As shown, when displayed in the grid 610, each of the cells may show a visual representation of the sensor data for the object. For example, the cell 612 is shown with a visual representation 614, which is a LIDAR point cloud image identified as corresponding to the object. Alternatively or additionally, the visual representation 614 may be any other sensor data corresponding to the object, such as camera image or radar image. In addition to visual representation of the sensor data, the cell 612 may display other information, such as an image number or scene number, one or more labels for the object, or values in the associated metadata. As such, the grid 610 may further improve the human operator's experience and efficiency by allowing the human operator to quickly skim through the grid 610 before focus on certain types of objects. For example, the human operator may skim through the grid 610 and notice that most of the objects look like cars (or have one of the label as "CAR"), and may decide to focus on diagnosing why such objects are causing a disproportionate amount of label discrepancies.

The interface 600 further provides a scene list 620, which lists the scenes from which the objects in each cell are perceived. For example, the first cell in the grid, cell 612, has a scene number 622. In this example, the scene number 622 includes the timestamp, such as "20111027_005552" (Oct. 27, 2011, 12:55:52 AM), and a sensor number, such as "c0005" (for example corresponding to one of the LIDAR sensors 124). Alternatively or additionally, the scenes may be identified by any type of information. As shown, the scenes are organized in an ascending chronological order. In other examples, the scenes may be organized in other ways, such as descending chronological order, by geographical location, by sensor number/type, etc.

Optionally, the interface 600 further provides an analytic tool 630. The analytic tool 630 may provide various analytical tools, such as search tool 640, filtering tool 650, and sorting tool 660. These analytic tools may be particularly helpful when the human operator wants to narrow the review immediately, or does so upon a quick skim of the cells in the grid 610 as described above. In this example view, the search tool 640 is selected. As shown, search fields 641, 642, and 643 allow human operators to search for cells in the grid 610 that correspond to objects that meet various search criteria. In this example, search field 641 allows human operator to search for cells that correspond to objects having a particular first label, search field 642 allows human operators to search for cells that correspond to objects having a particular second label, search field 643 allows human operator to search for cells that correspond to objects having a particular user-defined condition. The human operator may enter a value for all or some of the search fields. For example, as shown, the search field 643 is left blank.

The search tool 640 may further provide user configurable display parameters 644, such as maximum results. The human operator may then request the search, for example by selecting a search button 645. By doing so, the search request including the values for the search fields 641-643 and display parameters 644 may be sent to the processors 320 of the server 160. The processors 320 may then regenerate a new grid of cells based on the search request. For instance, the processors 320 may access the sets of labels, bounding boxes, associated metadata stored in the memory 310 to determine objects that meet the search field values, and regenerate a grid of cells associated with these objects.

As shown, by entering "CAR" for search field 641 and "not CAR" for search field 642, a new grid may be generated including only cells whose associated object has a first label of "CAR" and a second label that is anything other than a car. Referring to the example in FIG. 4C where the first corresponding label generated by object detection model 147 for object 401 is "CAR" but the second corresponding label generated by object detection model 148 for object 401 is "LAWN MOWER," object 401 would be associated with a cell in the regenerated grid. As such, the human operator may review at once all the objects that are labeled by the object detection model 147 as "CAR," but somehow labeled by the object detection model 148 as something else. This facilitates the review process in determining whether object detection model 147 is more or less useful for distinguishing cars from other objects (such as a lawn mower), or whether object detection model 148 is more or less useful for identifying or distinguishing cars from other objects.

Referring to the example in FIG. 4D where the first corresponding label generated by object detection model 147 for object 406 is "CAR" but the second corresponding label created by the human operator for object 406 is "EMERGENCY VEHICLE," object 406 would be associated with a cell in the regenerated grid. As such, the human operator may review at once all the objects that are labeled by the object detection model 147 as "CAR," but human operators identify these objects as something else. This facilitates the review process in determining whether object detection model 147 is not good at discriminating cars from other objects (such as an emergency vehicle), or for example, whether a human operator misidentified a car as an emergency vehicle.

Figure 7A:
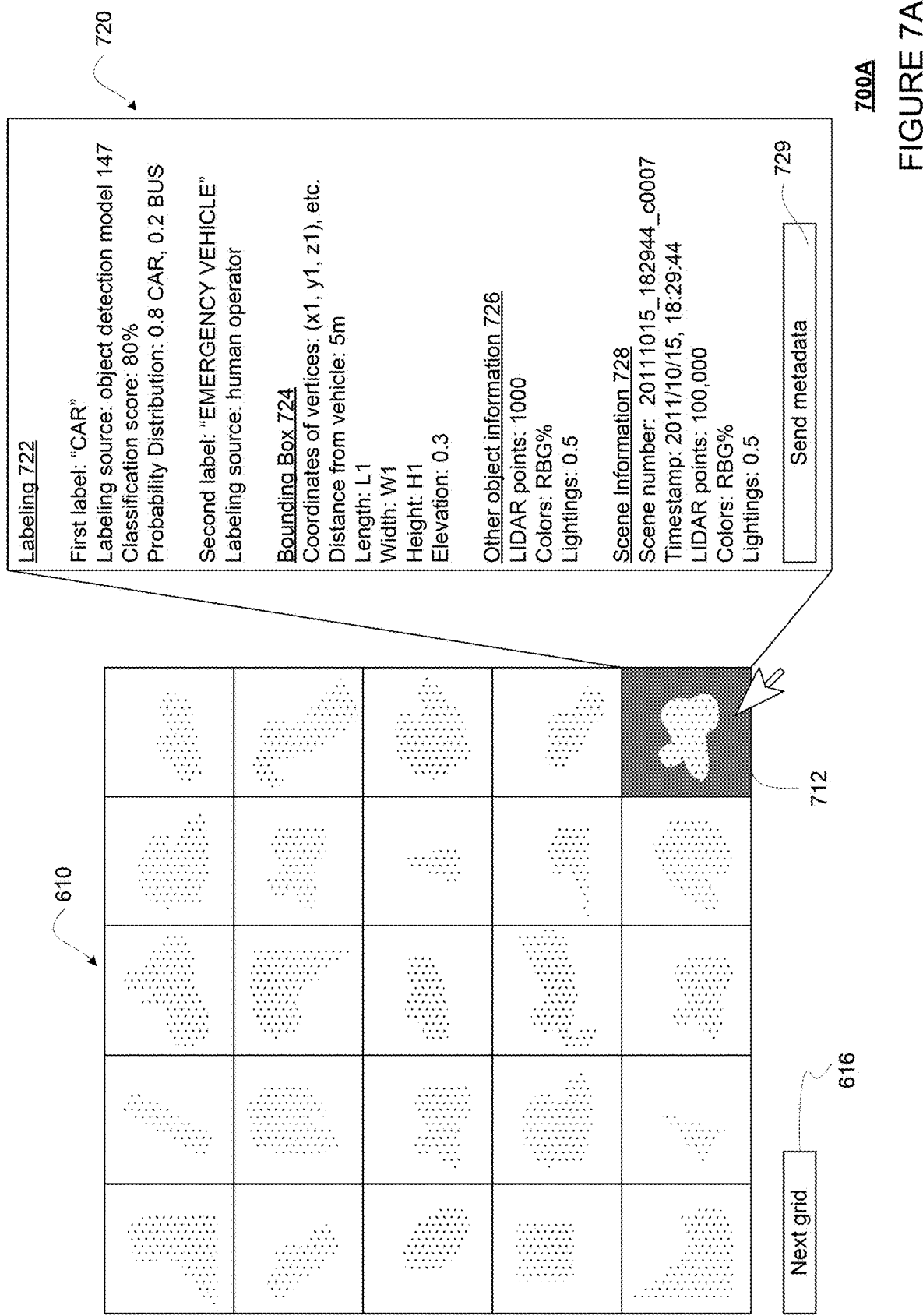
FIGS. 7A-7C illustrate example interactions with the example grid of FIGS. 6A-C in accordance with aspects of the disclosure.

In addition or as alternative to the search fields shown, the search tool 640 may provide the human operator with any other search field, including search fields specifying any of the features in the metadata associated with the objects or the scene of the object (see more examples in FIG. 7A). In one particular example, a human operator may search for objects by specifying a particular type of discrepancy between the first label and the second label. As such, the human operator may review all the objects where a model or a human may have mistaken one type of object for another, and thus targeting the review to determine factors that might have caused this particular confusion.

In this regard, the search tool 640 may allow for the identification of weaknesses in the object detection model, where, as noted above, the manually created labels had been created and reviewed by multiple human operators ("ground truth"), while the object detection model 147 may still be undergoing training or evaluation. For example, referring to FIG. 4D, if the human operator searches for objects having a first label of "CAR" and a corresponding second label of "EMERGENCY VEHICLE," object 406 would be associated with a cell in the regenerated grid. Upon reviewing the cell corresponding to object 406, and other cells with the same type of discrepancy, for example, it may be determined that the object detection model 147 has trouble recognizing some cars as emergency vehicles (for example failing to identify siren).

In addition to allow for the identification of weaknesses in object detection models, by allowing searches specifying a particular type of discrepancy, the search tool 640 may also be used to review the manually created labels for human error. For example, referring to FIG. 4D, if the human operator searches for objects having a first label of "CAR" and a corresponding second label of "EMERGENCY VEHICLE," object 406 would again be associated with a cell in the regenerated grid. Upon reviewing the cell corresponding to object 406, and other cells with the same type of discrepancy, for example, it may be determined that one or more of these are human errors (for example sometimes things on top of a car looks like sirens to human operators creating the labels).

Likewise, by allowing searches specifying a particular type of discrepancy, the search tool 640 may also be used to make specific comparisons between models, where, as noted above, both the first set of labels and the second set of labels are generated by different models. For instance, referring to FIG. 4C, if the human operator searches for objects having a first label of "CAR" and a corresponding second label of "TRUCK," object 404 would be associated with a cell in the regenerated grid. Upon reviewing the cell corresponding to object 404 and other cells with the same type of discrepancy, for example, it may be determined that the object detection model 147 often mislabels trucks as cars.

FIG. 6B shows another example view of interface 600 displaying the example grid 610. FIG. 6B shows many of the same features of FIG. 6A, but with differences as discussed further below. In this example view, the filtering tool 650 is selected in the analytical tool 630. Filter fields 651, 652, and 653 allow human operators to filter cells in the grid 610 based on various filtering criteria. As shown, filter field 651 allows human operators to filter cells based on time range, filter field 652 allows human operators to filter cells based on confidence score of one or more labels, and filter field 653 allows human operators to filter cells based on range of LIDAR point ranges. Although the example filter fields 651, 652, 653 are all ranges, in some examples the filter fields may allow filtering by exact value. As with search fields, the human operator may leave some of the filter fields empty.

The filtering tool 650 may also provide display parameters 644, such as maximum results. The human operator may then request the filter, for example by selecting a filter button 655. By doing so, the filter request including the values for the filter fields 651-653 and display parameters 644 may be sent to the processors 320 of the server 160. The processors 320 may then regenerate a new grid of cells based on the filter request. For instance, the processors 320 may access the sets of labels, bounding boxes, associated metadata stored in the memory 310 to determine which cells are associated with objects that meet the requested values for each filter field, and regenerate a grid of cells associated with these objects.

As an example, by entering "last month" for filter field 651, a new grid may be generated including only those objects that were perceived in scenes taken in the last month. This filter may be especially helpful if the object detection model 147 had undergone more training during the last month, and the human operator wanted to see any improvements in the labeling results. This filter may also be helpful if the human operator wants to review labels recently created by human operators that had not yet been reviewed.

By entering "<50%" for classification score in filter field 652, the new grid may be generated including only those objects whose classification score for one or both of the first or second corresponding label has a less than 50% chance of being correct. For example, this may be helpful when the human operator wants to focus the review of labels where the object detection models 147 and/or 148 are most uncertain.

By entering "# LIDAR points <100" in the filter field 653, the new grid may be generated including only those objects where there are less than 100 LIDAR points for the object. For example, this may be helpful when the human operator wants to focus the review of labels where the object detection models 147 and/or 148 might have difficulties identifying the object due to an insufficient number of data points.

In addition or as an alternative to the filter fields shown, the filter tool 650 may provide the human operator with any other filter field, including filter fields specifying any of the features in the metadata associated with the object or the scene of the object (see more examples in FIG. 7A).

FIG. 6C shows another example view of interface 600 displaying the example grid 610. FIG. 6C shows many of the same features of FIGS. 6A and 6B, but with differences as discussed further below. In this example view, the sorting tool 660 is selected in the analytic tool 630. Sorting fields 661, 662, and 663 allow human operators to sort the cells in grid 610 based on various sorting criteria. In this example, sorting field 661 allows human operator to sort the cells based on time, sorting filter field 662 allows human operators to sort the cells based on classification score of one or more labels, and sorting field 663 allows human operator to sort the cells based on the number of LIDAR points in the object. The human operator may use all or only some of the sorting fields.

The sorting tool 660 may also provide display parameters 644, such as maximum results. The human operator may then request the sort, for example by selecting a sort button 665. By doing so, the sort request including the selected sorting fields 661-663 and display parameters 644 may be sent to the processors 320 of the server 160. The processors 320 may then rearrange the cells in the grid 610 based on the sort request. For instance, the processors 320 may access the sets of labels, bounding boxes, associated metadata stored in the memory 310 to determine the relevant values for sorting, and then sort the cells in the grid based on these values.

As shown, by entering "increasing" for time in sorting field 661, the cells in the grid 610 may be rearranged in an increasing chronological order. For example, this may be helpful if one of the object detection models had been trained over time, the human operator wanted to see any improvements in the labeling results with time. For another example, this may be helpful for the human operator in finding patterns, such that as the time of the scene gets later into the night, more label discrepancies are found.

By entering "decreasing" for classification score in sorting field 662, the cells in the grid 610 may be rearranged in a decreasing order according to the classification score of the corresponding first label (and/or the corresponding second label the second set of labels are also generated by an object detection model). For example, it may be helpful for the human operator to review the cells having the highest classification scores but nonetheless have label discrepancies, to determine why such discrepancies occur despite the high confidence level of the object detection model. For another example, this may be helpful for the human operator in finding patterns, such as when the classification score decreases, more label discrepancies are found.

By entering "decreasing" for number of LIDAR points in the sorting field 663, the cells in the grid 610 may be rearranged in a decreasing order according to the number of LIDAR points in the object. For example, this may be helpful for the human operator in finding patterns, such as when the number of points in the object decreases, more label discrepancies are likely to be found. As another example, another pattern may be that objects with too many LIDAR points may include additional obstructions that tend to confuse the object detection model.

In addition or as alternative to the sorting fields shown, the sorting tool 660 may provide the human operator with any other sorting field, including sorting fields specifying any of the features in the metadata associated with the object or the scene of the object (see more examples in FIG. 7A).

Figure 7B:
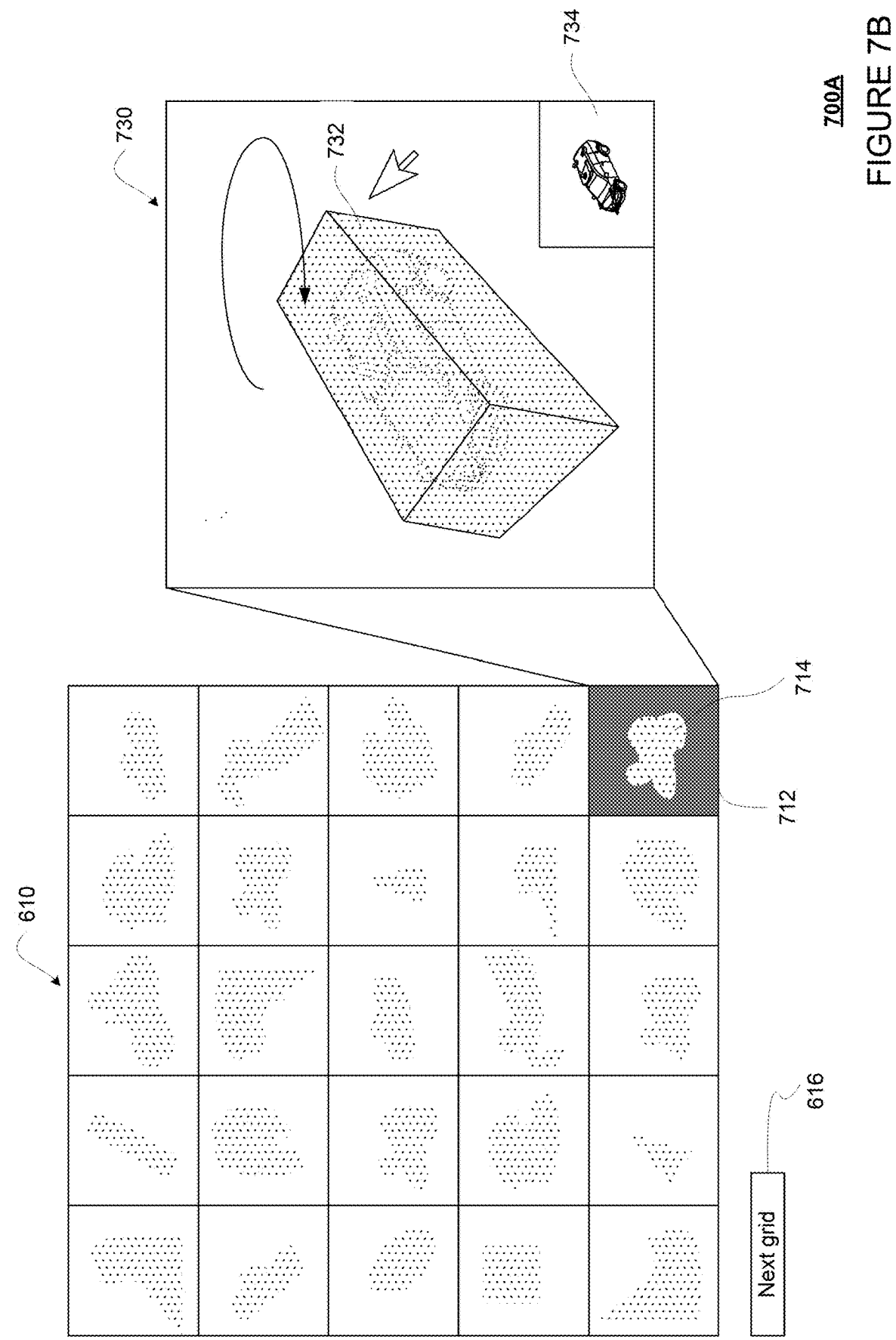
Figure 7C:
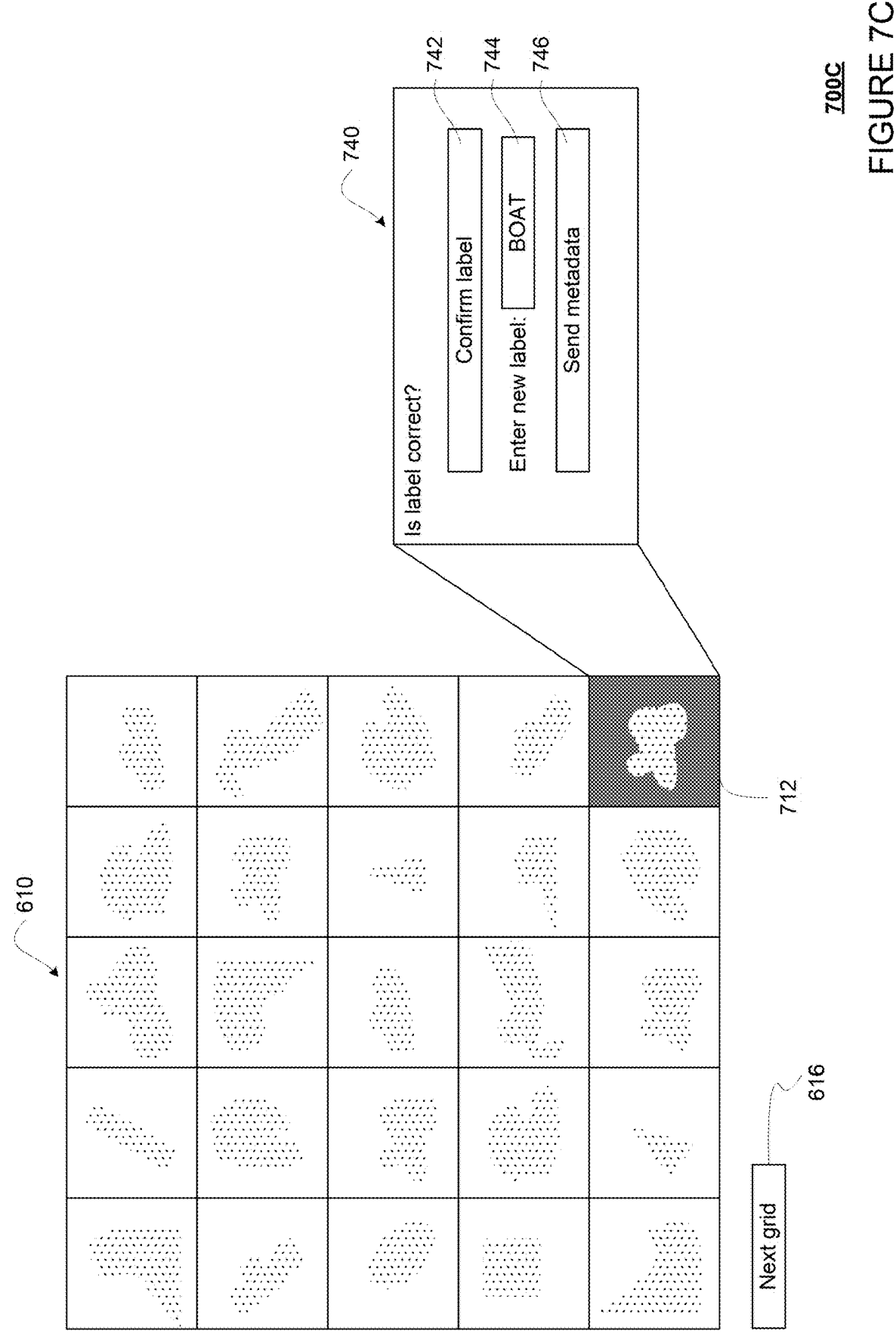

FIGS. 7A-C show example interfaces 700A-700C for allowing user interactions with the cells in the example grid 610. FIG. 7A shows an example interface 700A for displaying metadata. FIG. 7B shows an example interface 700B for providing an interactive visual tool. FIG. 7C shows an example interface 700B for providing a human operator prompt.

FIG. 7A shows an example interface 700A for displaying metadata. Interface 700A allows a human operator to review metadata for any cell in the grid 610. For instance, when the human operator wants to review metadata for a particular cell 712 in the grid 610, the viewer may select that cell. Upon receiving a user selection of the cell 712, the interface 700A may be configured to display metadata of the object associated with the selected cell 712. For example, the metadata may be displayed in a metadata viewer 720, such as on one side of the interface 700A next to the grid 610 or in a pop-up window.

The metadata may include information on the object associated with the cell 712, as well as various other information about the scene in which the object was identified. For example, the metadata may include labeling information 722, such as the labels for the object, probability distributions of the labels, classification score of the labels, etc. For another example, the metadata may include bounding box information 724 for that object, such as locations, distances (such as distance from the autonomous vehicle 110), dimensions, elevations, etc. For still another example, the metadata may include other object information 726, such as number of LIDAR points, colors in the object, lighting on the object, etc. For yet another example, the metadata may include scene information 728, such as the scene number, timestamp of the scene, total number of LIDAR points in the scene, lighting and colors of the scene, etc.

As such, the human operator may perform in depth diagnostics by reviewing the metadata of the objects and scenes associated with cells of the grid 610. This may be particularly useful when the human operator could not find patterns using analytic tools described above, such as searching, filtering, and sorting. For example, upon reviewing metadata of several cells in the grid 610, the human operator may find out that discrepancies are likely to occur with the color composition of the object are too similar to the color composition of the scene. To further facilitate review, the interface 700A may change an appearance of the cell 712 after the metadata of the cell 712 had been reviewed (for example, indicated by the fact that the metadata had been displayed). As shown, the cell 712 is darkened In addition, the metadata may be extracted from the object associated with the selected cell 712 for further training the object detection models, such as the object detection models 146-149. For instance, upon reviewing the metadata for selected cell 712, the human operator may decide that the object detection model 147 may benefit from further training with images of emergency vehicles, and click on a send metadata button 729 to send the metadata of cell 712 to train the object detection model 147. In this regard, the processors 320 of the server 160 may extract the metadata for selected cell 712 and send to the autonomous vehicle 110, or to a remote server for further training the object detection model 147. In some examples, the human operator may have option to send the metadata to more than one models for further training.

FIG. 7B shows another example interface 700B for providing an interactive visual tool. Interface 700B has many of the same features as interface 700A, but with differences as discussed further below. Interface 700B provides an interactive visual tool 730 for further explorations of any cell in the grid 610. For instance, once the human operator has found a set of objects for further investigation (for example through searching, filtering, or sorting), the human operator may want to compare the set of objects to determine patterns and anomalies. In this regard, the human operator may select the cell 712 corresponding to one of objects in the set. Upon receiving a user selection of the cell 712, the interface 700B may be configured to display the interactive visual tool 730.

As shown, where LIDAR point cloud 714 of the object associated with the cell 712 is displayed, the interactive visual tool 730 may allow the human operator to view the LIDAR points 732 of the object corresponding to a particular sensor angle, such as camera angle 734. For example, the interactive visual tool 730 may be displayed on one side of the interface 700B next to the grid 610 or in a pop-up window. By interacting with the interactive visual tool 730, such as by clicking or dragging, the interactive visual tool 730 may allow the human operator to view the LIDAR points 732 of the object corresponding to different sensor angles. Such an interactive visual tool 730 can therefore help the human operator, in an exploratory/experimental manner, find anomalies and patterns that may have resulted in inaccurate labels. For example, through this exploration, the human operator may find that at certain angles, the LIDAR points 732 of the object appears distorted. Additionally, the system may display associated metadata as the human operator views the LIDAR point cloud at different angles.

FIG. 7C shows another example interface 700C for providing a human operator prompt to confirm or correct labels. Interface 700C has many of the same features of 700A and 700B, but with differences as discussed further below. For example, the human operator may select a cell in the grid 610, such as cell 712, to review the manually created labels made by other human operators. As the human operator reviews, the interface 700C may display a human operator prompt 740 requesting the human operator to confirm or correct the manually created label that the human operator just reviewed.

As such, the human operator may select a confirm button 742 to confirm the manually created label. If the human operator concluded that the manually created label is incorrect, the human operator may enter a corrected label in the label input 744. The processors 320 of the server 160 may then update the manually created label of the object in the memory 310. Additionally, if the human operator decides that the object detection models 147 and/or 148 may benefit from further training using the metadata of the cell 712, the human operator may click on a send metadata button 746. The processors 320 may then extract the metadata and send to the autonomous vehicle 110 or a remote server for further training the object detection models 147 and/or 148. Alternatively, the metadata may be used by server 160 to further train the object detection models 147 and/or 148.

As an alternative to displaying a grid of cells, the system may generate a web-based page for displaying cells associated with one of the objects and/or the bounding boxes identified as having a discrepancy in its labels. FIG. 8 is an example flow diagram 800 in accordance with aspects of the disclosure which may be performed by one or more processors of one or more computing devices, such as the processors 320 of server 160, in order to generate a visual list for reviewing and analyzing labels generated by different labeling sources. Flow diagram 800 has many of the same features as flow diagram 500 of FIG. 5, but with differences as discussed further below.

In block 810, a first set of labels generated by a first labeling source is received, the first set of labels classifying one or more objects perceived in one or more scenes captured by a sensor of a vehicle, such that each of the one or more objects has a corresponding first label of the first set of labels. In block 820, a second set of labels generated by a second labeling source different from the first labeling source is received, the second set of labels classifying the one or more objects perceived in the scenes, such that each of the one or more objects has a corresponding second label of the second set of labels. In block 830, discrepancies between the corresponding first label and the corresponding second label for each of the one or more objects are determined.

In block 840, a visual list of cells is generated using the determined discrepancies, where each of the cells is associated with an object having a discrepancy between its corresponding first label and its corresponding second label. For instance, the processors 320 of the server 160 may generate a visual list of cells. For instance, each of the cells may be associated with one of the objects and/or the bounding boxes identified as having a discrepancy in its labels. In addition, each cell may be associated with a first label from the first set of labels and the corresponding second label from the second set of labels for the object. These labels may be displayed in the cells of the visual list, or may be displayed by interacting with the cells (such as click to open). In block 850, the visual list of cells is provided for display, for instance on a display of one of client devices 181-183 to a human operator.

Figure 9A:
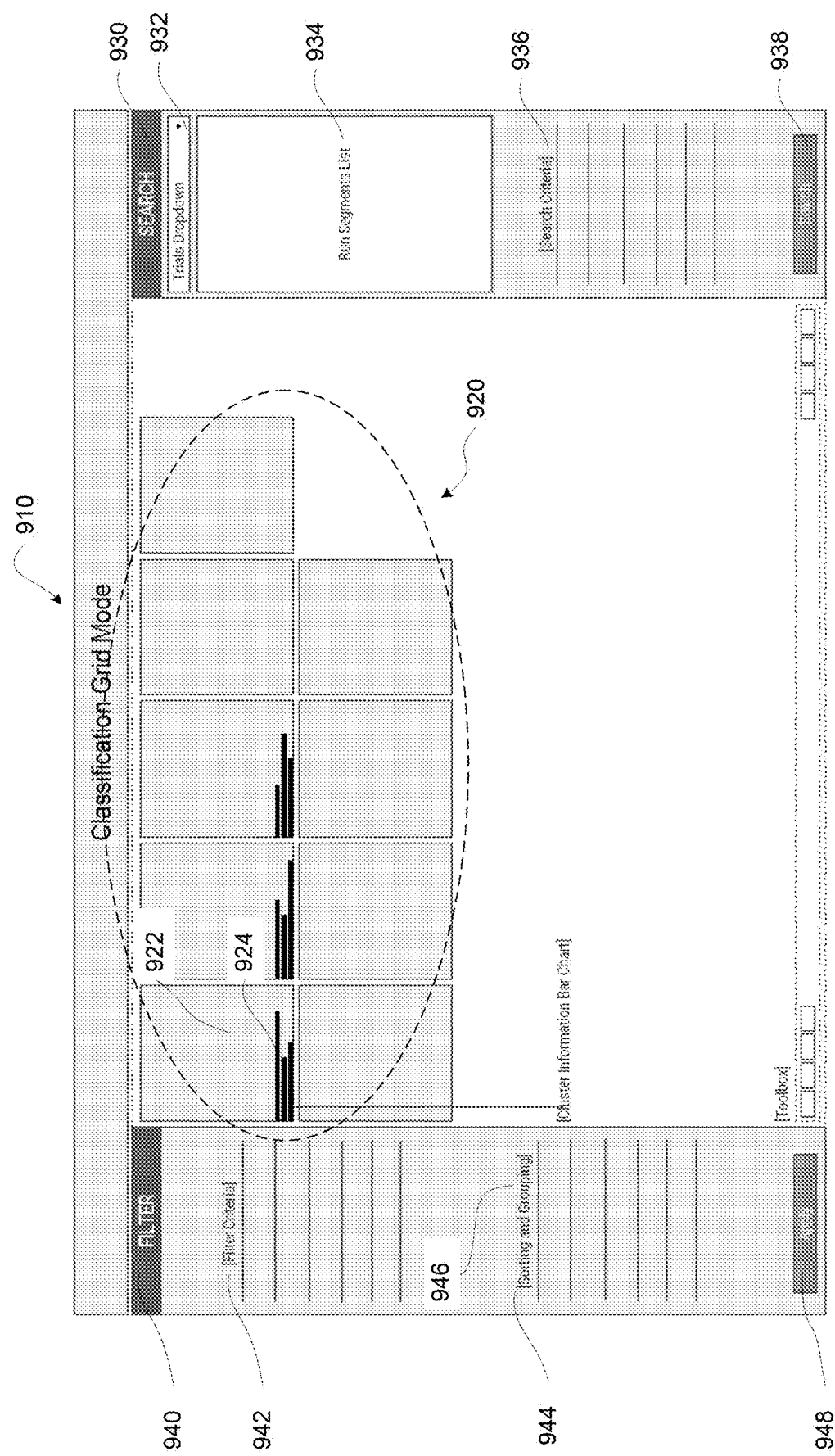
FIGS. 9A-9D show an example visual list on a web-based page in accordance with aspects of the disclosure.
Figure 9B:
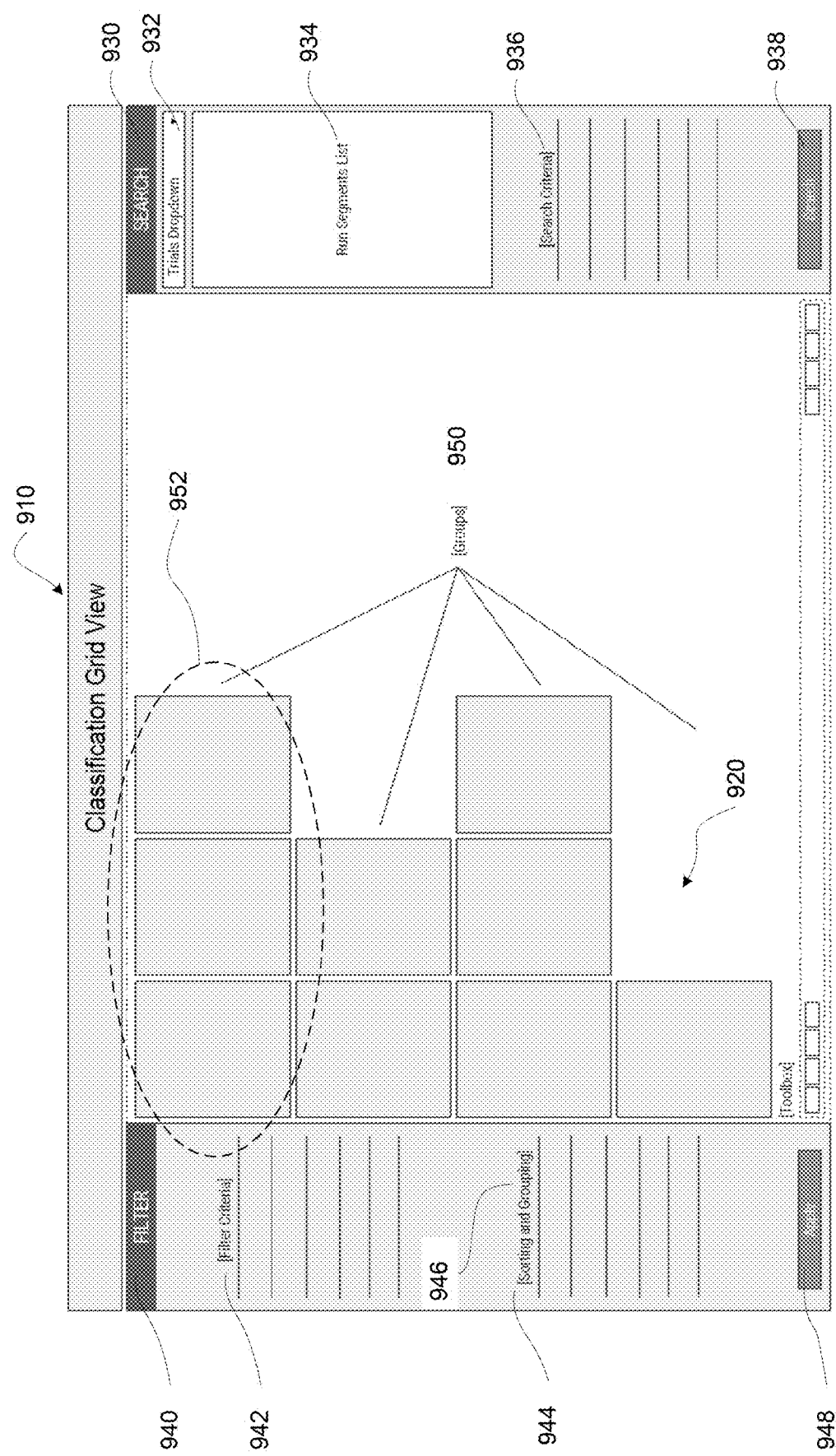
Figure 9C:
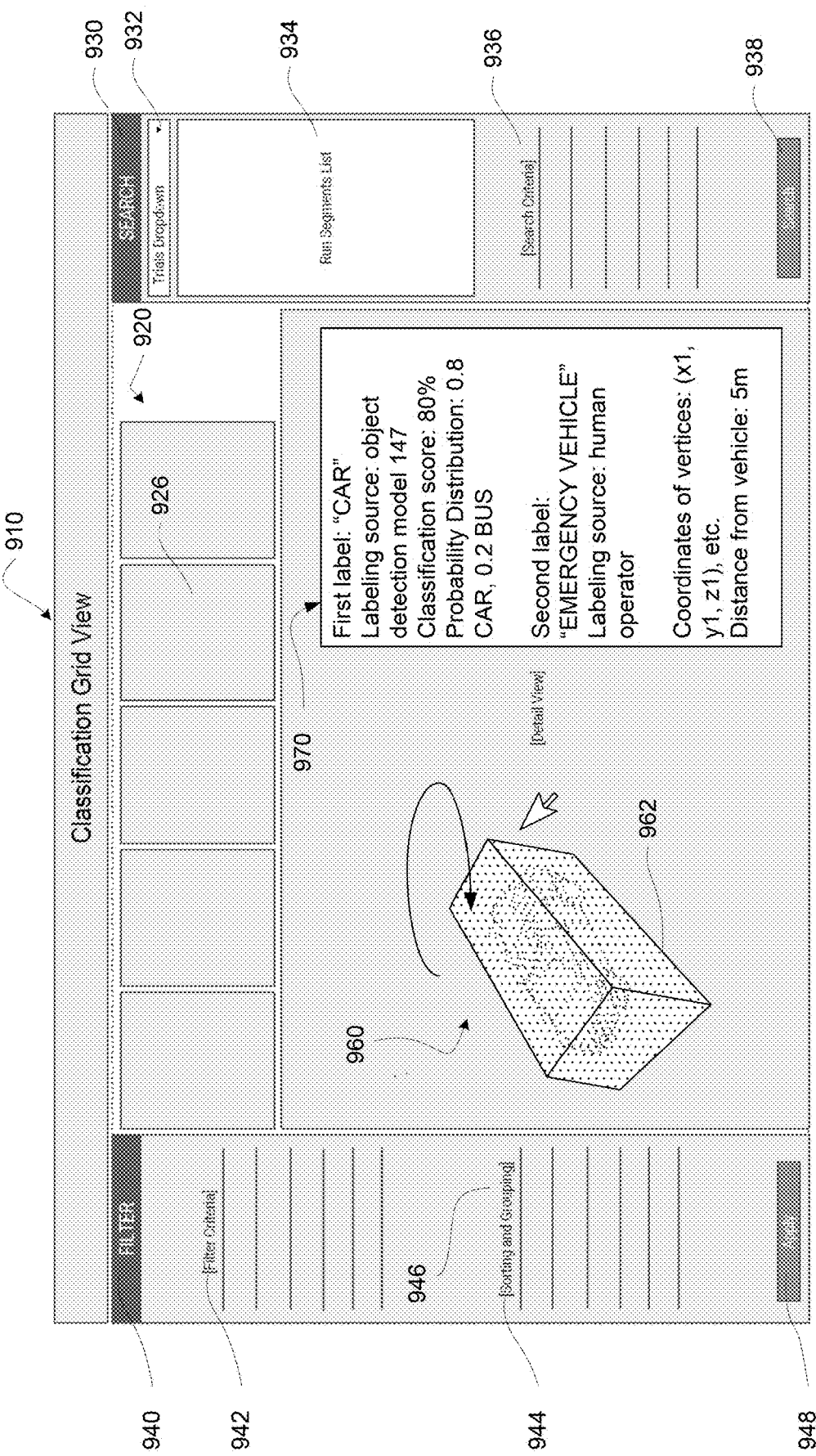
Figure 9D:
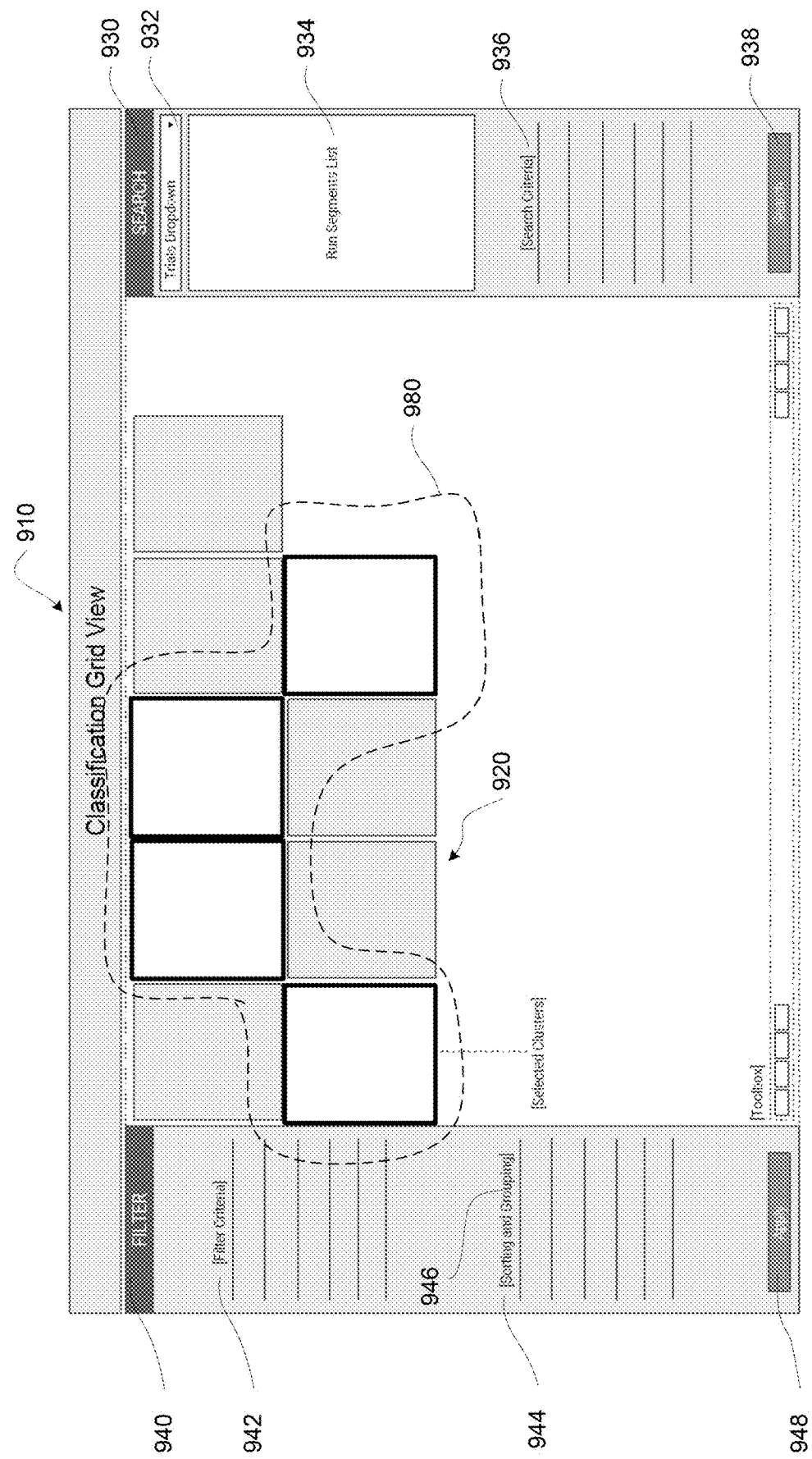

FIGS. 9A-D show example views of an example web-based page for displaying example visual lists. FIG. 9A shows an example view 900A of a visual list with graphical representations. FIG. 9B shows an example view 900B of a visual list that is grouped based on grouping criteria. FIG. 9C shows an example view 900C displaying details on the associated object of a selected cell. FIG. 9D shows an example view where multiple cells of the visual list are selected.

FIG. 9A shows an example view 900A of web-based page 910 displaying an example visual list 920. For example, the page 910 may be stored on the server 160 or a client device, such as client devices 181-183. The visual list 920 include cells, such as cell 922. The cell 922, and all the other cells in the visual list 920 are associated with an object that has a labeling discrepancy, just like the cells in the example grid 610. A user may scroll down to see more cells in the visual list 920.

Although the visual list 920 shown has 9 cells, the visual list 920 may be of any size, depending the number of objects having a labeling discrepancy. The number of cells displayed on the page 910 may be configurable by a user, for example by entering a desired number of cells per page, selecting a predetermined number of cells per page from a drop down menu, or zooming in and out to change the size of the cells. When the visual list 920 have more cells than can be fit on one page, the user may select a next page, for example by clicking a link on the page 910.

As shown, when displayed in the visual list 920, some or all of the cells may show a graphical representation of one or more features of metadata associated with the cell. For example, the cell 922 is shown with a graphical representation 924. For example, the graphical representation 924 may be a bar chart including values for one or more features in the metadata associated with cell 922. As shown, the bar chart of graphical representation 924 includes 3 bars. As an example, a first bar of the bar chart could represent the classification score of the first corresponding label for the object associated with cell 922, a second bar of the bar chart could represent the number of LIDAR points in the object associated with cell 922, and a third bar of the bar chart could represent an amount of light on the object associated with cell 922. In addition to graphical representation 924, the cell 922 may show other information, including any value in the associated metadata, or sensor images of the object associated with cell 922.

Optionally, the page 910 further provides various analytical tools. As shown, the right side of the page 910 provides search tools 930. As shown, the search tools 930 include a trial dropdown menu 932 for selecting a particular trial, for example by date/time. For instance, each trial may be a trip completed by the autonomous vehicle 110. Once a trial is selected, the trial may be broken down into segments, and presented in a run segment list 934. As shown the search tools 930 may further include various search criteria 936, such as any of the search fields described in relation to FIG. 6A. By selecting from the trial dropdown menu 932 and the run segment list 934, and by entering or selecting values into the search criteria 936, a human operator can search for objects that were detected in a particular run segment of a particular trip completed by autonomous vehicle 110 that meet values entered into search criteria 936. The search tools 930 further include a search button 938, which may be selected by the human operator to execute the searching.

The left side of the page 910 provides filtering tools 940. As shown, filtering tools 940 includes filtering criteria 942, such as any of the filter fields described in relation to FIG. 6B. Filtering tools 940 also includes sorting criteria 944, such as any of the sorting fields described in relation to FIG. 6C. Filtering tools 940 further includes grouping criteria 946, which is described below with respect to FIG. 9B. By entering or selecting values for the filtering criteria 942, sorting criteria 944, and/or grouping criteria 946, a human operator can view selections of cells in order to find patterns. The filtering tools 940 further include an apply button 948, which may be selected by the human operator to execute the filtering, sorting, and/or grouping.

FIG. 9B shows an example view 900B of web-based page 910 displaying the example visual list 920 when grouping is applied. FIG. 9B shows many of the same features as FIG. 9A, but with differences as discussed further below. As mentioned above, the filtering tools 940 include grouping criteria 946, which may be any of the features in the metadata associated with the object or the scene of the object (see more examples in FIG. 7A). For instance, when a human operator enters or selects a grouping criteria 946, the cells in the visual list 920 are displayed on page 910 in groups, such as groups 950. As shown, the groups 950 are displayed in rows, where cells belonging to the same group are displayed in the same row, such as group 952. Alternatively, cells belonging to the different groups may be displayed in different columns. In this regard, each row or column may not display the same number of cells.

For example, the human operator may enter or select the number of LIDAR points in the associated object as the grouping criteria. As such, cells in the visual list 920 may be rearranged into groups 950 according to the number of LIDAR points in the associated object. For example, cells in each group of the groups 950 may have a number of LIDAR points falling within a same predetermined range. For instance, the first group 952 may display 3 cells where the object has 1-50 points, the second group below the first group 952 may display 2 cells where the object has 50-100 points, etc. Similar to the sorting function, the grouping function facilitates pattern finding, for example, the human operator may quickly see based on the groups if any particular group has a disproportionate number of cells (indicating a disproportionate number of label discrepancy for that particular group). Further, grouping may provide more transparent visuals than sorting in pattern finding. For example, sorting by timestamps may arrange the cells in a chronological order, but a better visual may be grouping the cells by days, weeks, months, seasons, etc., or day v. night.

FIG. 9C shows an example view 900C of web-based page 910 displaying the example visual list 920 when details of an example cell is displayed. FIG. 9C shows many of the same features as FIGS. 9A and 9B, but with differences as discussed further below. For example, cell 926 of the visual list 920 is shown selected. Upon receiving a user request (such as a selection of a button or other option), an interactive visual tool 960 displays an interactive visual representation 962 of the object associated with cell 926. Further, metadata viewer 970 displays In this regard, the interactive visual tool 960 may be configured as interactive visual tool 730 described in FIG. 7B and metadata viewer 970 may be configured as metadata viewer 720 of FIG. 7A.

FIG. 9D shows an example view 900D of web-based page 910 displaying the example visual list 920 when several cells of the visual list 920 are selected. FIG. 9D shows many of the same features as FIGS. 9A-C, but with differences as discussed further below. For example, a viewer may see the visual list 920, and see that several cells of the visual list 920 are of the same object, but captured in different scenes, and make a selection 980 of these multiple cells (for example by selecting or selecting and dragging). For another example, a viewer may make the selection 980 of these multiple cells in the visual list 920, and perform any of the functions described above, such as search, filter, sort, and group the cells in the selection 980. For still another example, the human operator may interact with the selection 980 to get detailed views of the cells in the selection 980, such as those shown in FIG. 9B.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for displaying grids of data in order to facilitate operator review of labels, comprising:
   receiving, by one or more processors, a first set of labels generated by a first labeling source, the first set of labels classifying one or more objects perceived in one or more scenes captured by a sensor of a vehicle, such that each of the one or more objects has a corresponding first label of the first set of labels;
   receiving, by the one or more processors, a second set of labels generated by a second labeling source different from the first labeling source, the second set of labels classifying the one or more objects perceived in the scenes, such that each of the one or more objects has a corresponding second label of the second set of labels;
   determining, by the one or more processors, discrepancies between the corresponding first label and the corresponding second label for each of the one or more objects;
   generating, by the one or more processors using the determined discrepancies, a grid of cells, where each of the cells is associated with an object having a discrepancy between its corresponding first label and its corresponding second label; and
   providing, by the one or more processors, the grid of cells for display to a human operator.

2. The method of claim 1, further comprising:
   receiving, by the one or more processors, a request to search for cells by a specified value for the first corresponding label;
   regenerating, by the one or more processors, a grid of cells, where each of the cells is associated with an object whose corresponding first label is equal to the specified value; and
   providing, by the one or more processors, the regenerated grid for display to the human operator.

3. The method of claim 1, further comprising:
   receiving, by the one or more processors, a request to search for cells by a specified type of discrepancy between the corresponding first label and the corresponding second label;
   regenerating, by the one or more processors, a grid of cells, where each of the cells is associated with an object whose corresponding first label and corresponding second label has the specified type of discrepancy; and
   providing, by the one or more processors, the regenerated grid for display to the human operator.

4. The method of claim 1, wherein the first set of labels are generated using an object detection model, and the second set of labels are created manually by human operators.

5. The method of claim 4, further comprising:
   in response to the providing the grid of cells for display, receiving, by the one or more processors, an user input selecting a cell of the grid of cells; and
   in response to receiving the user input, providing, by the one or more processors, metadata for the object associated with the selected cell for display to the human operator.

6. The method of claim 5, further comprising:
   receiving, by the one or more processors, an indication that the human operator had reviewed the metadata; and in response to receiving the indication, changing an appearance of the selected cell, by the one or more processors, in order to mark the selected cell as being reviewed.

7. The method of claim 5, further comprising:
receiving, by the one or more processors, an user input flagging the object for further training the object detection model; and
in response to receiving the user input, sending, by the one or more processors, the metadata to a remote server for further training the object detection model.

8. The method of claim 4, further comprising:
in response to the providing, by the one or more processors, the grid of cells for display, receiving an user input selecting a cell;
in response to receiving the user input, providing, by the one or more processors, an interactive visual representation of the object associated with the selected cell for display to the human operator, wherein the interactive visual representation includes a plurality of images taken from different sensor angles corresponding to a plurality of views of the object;
receiving, by the one or more processors, a user selection of one of the plurality of views of the object; and
providing, by the one or more processors, the selected view of the object for display to the human operator.

9. The method of claim 8, further comprising:
providing, by the one or more processors, metadata associated with the selected view of the object for display to the human operator.

10. The method of claim 4, further comprising:
in response to the providing, by the one or more processors, the grid of cells for display, receiving a first user input selecting a cell;
receiving, by the one or more processors, a second user input including a corrected second label; and
in response to receiving the second user input, updating, by the one or more processors, the corresponding second label with the corrected second label.

11. The method of claim 1, wherein the first set of labels are generated using a first object detection model, and the second set of labels are generated using a second object detection model, the first object detection model being different from the second object detection model.

12. The method of claim 11, further comprising:
in response to the providing the grid of cells for display, receiving, by the one or more processors, a first user input selecting a cell of the grid of cells;
in response to receiving the first user input, providing, by the one or more processors, metadata of the object associated with the selected cell for display to the human operator;
receiving, by the one or more processors, a second user input flagging the object for further training the first object detection model; and
sending, by the one or more processors, the metadata to a remote server for further training the first object detection model.

13. A method for displaying lists of data in order to facilitate operator review of labels, comprising:
receiving, by one or more processors, a first set of labels generated by a first labeling source, the first set of labels classifying one or more objects perceived in one or more scenes captured by a sensor of a vehicle, such that each of the one or more objects has a corresponding first label of the first set of labels;
receiving, by the one or more processors, a second set of labels generated by a second labeling source different from the first labeling source, the second set of labels classifying the one or more objects perceived in the scenes, such that each of the one or more object has a corresponding second label of the second set of labels;
determining, by the one or more processors, discrepancies between the corresponding first label and the corresponding second label for each of the one or more objects;
generating, by the one or more processors using the determined discrepancies, a visual list of cells, where each of the cells is associated with an object having a discrepancy between its corresponding first label and its corresponding second label; and
providing, by the one or more processors, the visual list of cells for display to a human operator.

14. The method of claim 13, further comprising:
receiving, by the one or more processors, a request to group cells of the visual list of cells by the first corresponding label;
in response to the request, regenerating, by the one or more processors, the visual list of cells, where cells of the regenerated visual list of cells are organized in rows and cells having the same first corresponding label are displayed in the same row; and
providing, by the one or more processors, the regenerated visual list of cells for display to the human operator.

15. The method of claim 13, further comprising:
receiving, by the one or more processors, a request to group cells of the visual list of cells by a number of points in the object associated with the cell;
in response to the receiving the request, regenerating, by the one or more processors, the visual list of cells, where cells of the regenerated visual list of cells are organized in rows and cells whose associated object having a number of points falling within a same predetermined range are displayed in the same row; and
providing, by the one or more processors, the regenerated visual list for display.

16. The method of claim 13, further comprising:
in response to the providing the visual list of cells for display, receiving, by the one or more processors, an user input selecting a cell; and
providing, by the one or more processors for display to the human operator, a graphical representation of one or more features in metadata of the object associated with the selected cell.

17. The method of claim 13, wherein the first set of labels are generated using an object detection model, and the second set of labels are created manually by a human operator.

18. The method of claim 17, further comprising:
in response to the providing the visual list of cells for display, receiving, by the one or more processors, an user input selecting a cell; and
in response to receiving the user input, providing, by the one or more processors, metadata of the object associated with the selected cell for display to the human operator.

19. The method of claim 17, further comprising:
in response to the providing the visual list of cells for display, receiving, by the one or more processors, an user input selecting a cell;
in response to the received user input, providing, by the one or more processors, an interactive visual representation of the object associated with the selected cell for display, wherein the interactive visual representation includes a plurality of images taken from different sensor angles corresponding to a plurality of views of the object;

receiving, by the one or more processors, a user selection of one of the plurality of views of the object; and providing, by the one or more processors, the selected view of the object for display to the human operator.

20. The method of claim 13, wherein the first set of labels are generated by a first object detection model, and the second set of labels are generated by a second object detection model, wherein the first object detection model is different from the second object detection model.

* * * * *